United States Patent
Hayton et al.

(10) Patent No.: US 9,152,401 B2
(45) Date of Patent: Oct. 6, 2015

(54) METHODS AND SYSTEMS FOR GENERATING AND DELIVERING AN INTERACTIVE APPLICATION DELIVERY STORE

(75) Inventors: Richard Hayton, Cambridge (GB); Andrew Innes, Cambridge (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 558 days.

(21) Appl. No.: 12/773,007

(22) Filed: May 3, 2010

(65) Prior Publication Data

US 2010/0281528 A1 Nov. 4, 2010

Related U.S. Application Data

(60) Provisional application No. 61/174,995, filed on May 2, 2009, provisional application No. 61/187,269, filed on Jun. 15, 2009.

(51) Int. Cl.
*G06F 9/54* (2006.01)
*G06F 9/445* (2006.01)
*G06F 9/46* (2006.01)

(52) U.S. Cl.
CPC *G06F 8/60* (2013.01); *G06F 9/468* (2013.01); *G06F 9/54* (2013.01); *G06F 2209/549* (2013.01)

(58) Field of Classification Search
CPC .................................. G06F 9/465; G06F 9/547
USPC ....................................... 726/7; 717/174–178
See application file for complete search history.

(56) References Cited

U.S. PATENT DOCUMENTS

| | | | | |
|---|---|---|---|---|
| 5,491,800 | A * | 2/1996 | Goldsmith et al. | 709/221 |
| 6,157,961 | A * | 12/2000 | Kessler et al. | 719/315 |
| 6,606,708 | B1 * | 8/2003 | Devine et al. | 726/8 |
| 6,654,888 | B1 * | 11/2003 | Cooper et al. | 713/190 |
| 6,839,897 | B2 * | 1/2005 | Takagi | 719/330 |
| 6,901,588 | B1 * | 5/2005 | Krapf et al. | 717/164 |
| 6,928,469 | B1 * | 8/2005 | Duursma et al. | 709/223 |
| 7,293,266 | B2 * | 11/2007 | Safa | 717/162 |
| 7,434,234 | B2 * | 10/2008 | Gheorghe et al. | 719/330 |
| 7,533,388 | B1 * | 5/2009 | Cavanaugh | 719/330 |
| 7,660,871 | B2 * | 2/2010 | Koh et al. | 709/217 |

(Continued)

FOREIGN PATENT DOCUMENTS

EP 1914631 A1 * 4/2008 ............... G06F 9/46

*Primary Examiner* — Jason K. Gee
*Assistant Examiner* — Zhimei Zhu
(74) *Attorney, Agent, or Firm* — Foley and Lardner LLP; John D. Lanza

(57) ABSTRACT

A system for updating and delivering an interactive application delivery store, where the system includes a client computer, a server and an application delivery store executing on the server, the client computer communicating with the server over a communicative connection. A user accesses the application delivery store using the client computer, and subscribes to an application not included in a user profile of the user using the application delivery store. In response to subscribing to the application, the application delivery store verifies user permissions of the user and determines whether the user is permitted to subscribe to the application. Upon determining the user can subscribe to the application, the application delivery store updates the user profile with the application and transmits a stub application to the client computer. The stub application represents the application subscribed to by the user in that the stub application includes a portion of the application.

25 Claims, 16 Drawing Sheets

(56) References Cited

U.S. PATENT DOCUMENTS

| | | | |
|---|---|---|---|
| 7,917,913 B2* | 3/2011 | Eker et al. | 719/315 |
| 8,291,490 B1* | 10/2012 | Ahmed et al. | 726/17 |
| 8,296,745 B2* | 10/2012 | Simon et al. | 717/148 |
| 8,407,669 B2* | 3/2013 | Yee et al. | 717/120 |
| 2001/0002473 A1* | 5/2001 | Waldo et al. | 709/229 |
| 2002/0032763 A1* | 3/2002 | Cox et al. | 709/223 |
| 2002/0059212 A1* | 5/2002 | Takagi | 707/3 |
| 2003/0093660 A1* | 5/2003 | Safa | 713/1 |
| 2003/0131053 A1* | 7/2003 | Gheorghe et al. | 709/203 |
| 2004/0054717 A1* | 3/2004 | Aubry et al. | 709/203 |
| 2004/0054923 A1* | 3/2004 | Seago et al. | 713/201 |
| 2004/0111464 A1* | 6/2004 | Ho et al. | 709/203 |
| 2004/0193546 A1* | 9/2004 | Tokutani et al. | 705/59 |
| 2005/0005200 A1* | 1/2005 | Matena et al. | 714/38 |
| 2005/0021698 A1* | 1/2005 | Devarakonda et al. | 709/220 |
| 2005/0149914 A1* | 7/2005 | Krapf et al. | 717/136 |
| 2005/0198292 A1* | 9/2005 | Duursma et al. | 709/225 |
| 2005/0209984 A1* | 9/2005 | Brown et al. | 707/1 |
| 2005/0278417 A1* | 12/2005 | Fremantle et al. | 709/203 |
| 2006/0059561 A1* | 3/2006 | Ronning et al. | 726/26 |
| 2006/0069722 A1* | 3/2006 | Dowling | 709/203 |
| 2007/0107044 A1* | 5/2007 | Yuen et al. | 726/2 |
| 2007/0156659 A1* | 7/2007 | Lim | 707/3 |
| 2007/0201654 A1* | 8/2007 | Shenfield | 379/201.01 |
| 2008/0004886 A1* | 1/2008 | Hames et al. | 705/1 |
| 2008/0072244 A1* | 3/2008 | Eker et al. | 719/330 |
| 2008/0256510 A1* | 10/2008 | Auerbach | 717/107 |
| 2009/0099940 A1* | 4/2009 | Frederick et al. | 705/26 |
| 2009/0100448 A1* | 4/2009 | Baker et al. | 719/330 |
| 2009/0172652 A1* | 7/2009 | Simon et al. | 717/148 |
| 2010/0262953 A1* | 10/2010 | Barboni et al. | 717/120 |

* cited by examiner

| Enrollment Rules | | Resource Group | | |
|---|---|---|---|---|
| | | Workstations | CAD Term | Admin Terminals |
| User Group | IT | X | X | X |
| | Engineers | X | X | |
| | Assts | | | X |

FIG. 3

| Users | TermA | TermB | TermC | AdminA | AdminB | AdminC | CAD A | CAD B | CAD C |
|---|---|---|---|---|---|---|---|---|---|
| Tara |  | x |  | x |  |  |  | x | x |
| Tom | x |  |  | x | x |  |  | x | x |
| Ted | x | x |  | x | x |  |  | x | x |
| Ellie | x |  | x |  | x |  | x | x |  |
| Erica |  | x |  | x |  |  | x | x | x |
| Edward |  |  |  |  |  |  |  |  | x |
| Alex |  |  |  |  | x | x | x |  |  |
| Amy |  |  |  |  |  |  |  |  |  |
| Andrew |  |  |  |  |  |  |  |  |  |

FIG. 5

METHODS AND SYSTEMS FOR GENERATING AND DELIVERING AN INTERACTIVE APPLICATION DELIVERY STORE

RELATED APPLICATIONS

This Patent Application claims priority to U.S. Provisional Patent Application Ser. No. 61/174,995, filed on May 2, 2009, and U.S. Provisional Patent Application Ser. No. 61/187,269 filed on Jun. 15, 2009, where the disclosure of both applications are considered part of the disclosure of this application and are herein incorporated by reference in their entirety.

FIELD OF THE DISCLOSURE

The methods and systems described herein relate generally to remotely providing applications to a computing machine. More specifically, the methods and systems relate to self-subscribing to applications and generating and delivering an interactive store to an end user.

BACKGROUND OF THE DISCLOSURE

Typically applications are remotely provided to users via a web-based application that populates links associated with an address such that when the links are selected by a user, the web-based application establishes a communication channel between a client computer and a server. The web-based application can then facilitate transmitting graphical application data over the communication channel, where the graphical application data represents an application executing on the server. This process allows a user on the client computer to interact with an application executing on the server through the windows generated by the web-based application. In some instances, the communication channel and interaction between the remote application and the client can occur only after a user logs into a remote delivery system.

In most embodiments, a user likely is required to use the web-based application interface to remotely access applications executing on the server. Further, the applications enumerated within the web-based application interface typically included a group or set of applications that are configured by an administrator. The applications included in the enumeration can include each application a user has permission to use despite whether the user actually uses the application. Thus, users only have access to those applications provided to them by an administrator There exists a need for an interactive application delivery store that permits users to self-subscribe to applications they not only have permission to use, but that they wish to use. An additional feature of this may be installing a stub application representative of the remotely accessible application so that a user of a client machine can access the application via a desktop on a client machine rather then via a web-based application interface.

SUMMARY OF THE DISCLOSURE

In one aspect described herein is a method for updating and delivering an interactive application delivery store. A user using an application delivery store executing on a server, subscribes to an application not included in a user profile of the user, the user accessing the application delivery store using a client computer communicating with the application delivery store. Responsive to subscribing to the application, the application delivery store verifies user permissions of the user, and responsively determines the user is permitted to subscribe to the application. In response to the determination, the application delivery store updates the user profile of the user with the application, and transmits a stub application to the client computer, the stub application representative of the application.

In some embodiments, verifying user permissions includes obtaining user credentials of the user and evaluating the user credentials to determine applications the user is permitted to access.

In other embodiments, subscribing to the application further includes subscribing to the application using an application delivery store interface of the application delivery store.

In still other embodiments, transmitting the stub application further includes transmitting the stub application to an application delivery store interface executing on the client computer. In another embodiment, the method includes determining, by the client application delivery store interface, a user of the client computer executed the stub application, establishing, by the client application delivery store interface responsive to the determination, a communicative connection between the client computer and the server, and transmitting, by the client application delivery store interface over the established communicative connection, a request for access to an application corresponding to the stub application. The server application delivery store, in some embodiments, executes responsive to receiving the request, the application corresponding to the stub application. Application output generated by the application is then transmitted to the client computer.

In one embodiment, the client computer receives the stub application from the server, and installs the stub application on the client computer. Installing the stub application can include installing the stub application into a client application delivery store storage repository.

In yet another embodiment, transmitting the stub application further comprises transmitting a stub application comprising a portion of the application subscribed to by the user. In still another embodiment, updating the user profile further comprises updating an instance of the application delivery store associated with the user.

In still another embodiment, the server communicates with the client computer using web services.

The application delivery store, in some embodiments, transmits application information. The client computer, in one embodiment, receives the application information and generates a stub application using the received application information.

In another aspect, described herein is a system for updating and delivering an interactive application delivery store.

BRIEF DESCRIPTION OF THE DRAWINGS

The following figures depict certain illustrative embodiments of the methods and systems described herein, where like reference numerals refer to like elements. Each depicted embodiment is illustrative of these methods and systems and not limiting.

FIG. 3 is a table depicting example enrollment rules according to an illustrative embodiment of the invention.

FIG. 5 is an enrollment database depicting an example set of enrollments according to an illustrative embodiment of the invention.

DETAILED DESCRIPTION OF THE DRAWINGS

Figure 1A:
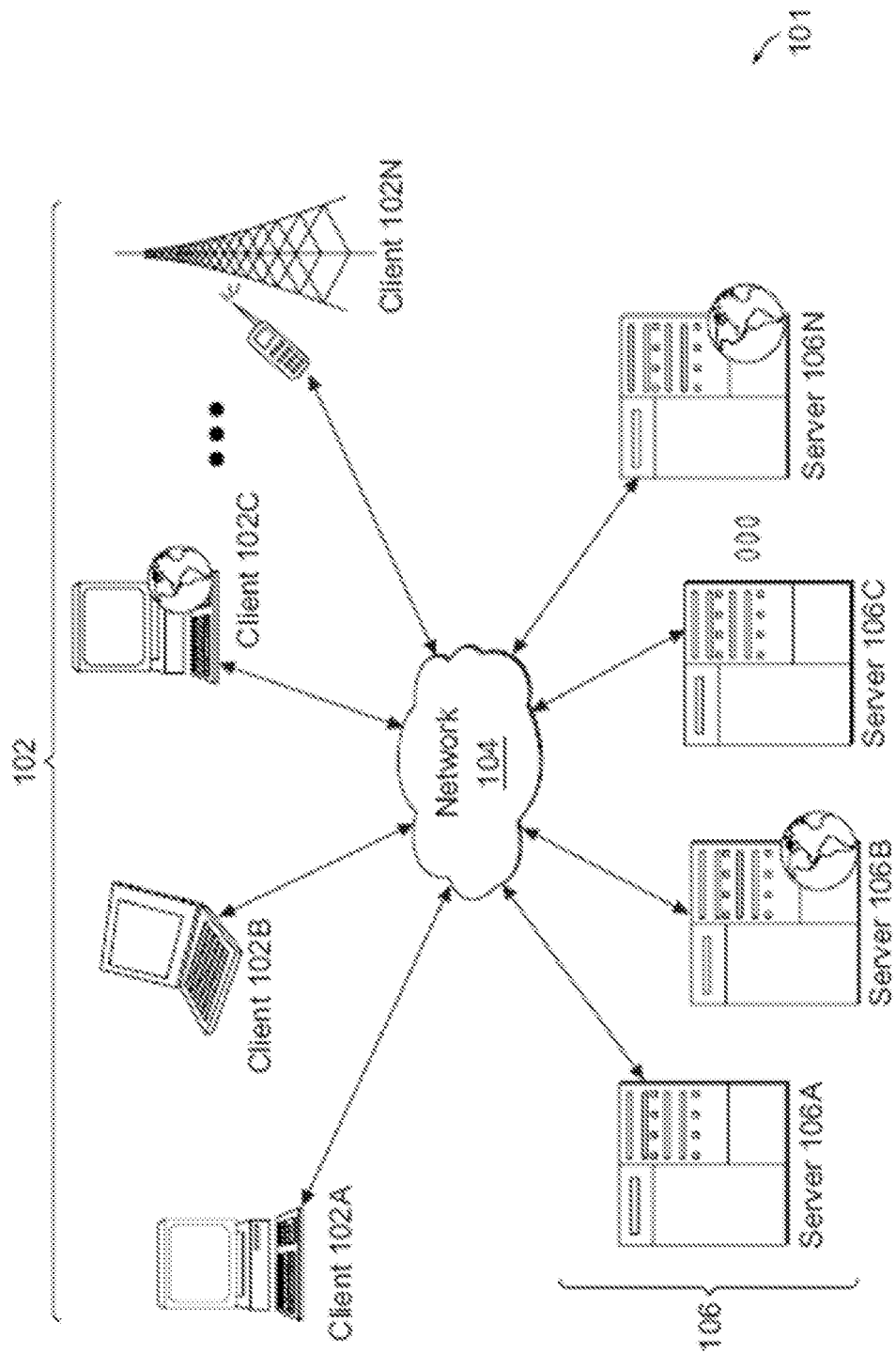
FIG. 1A is a block diagram illustrative of an embodiment of a remote-access, networked environment with a client machine that communicates with a server.

FIG. 1A illustrates one embodiment of a computing environment 101 that includes one or more client machines 102A-102N (generally referred to herein as "client machine(s) 102") in communication with one or more servers 106A-106N (generally referred to herein as "server(s) 106"). Installed in between the client machine(s) 102 and server(s) 106 is a network.

In one embodiment, the computing environment 101 can include an appliance installed between the server(s) 106 and client machine(s) 102. This appliance can mange client/server connections, and in some cases can load balance client connections amongst a plurality of backend servers.

The client machine(s) 102 can in some embodiment be referred to as a single client machine 102 or a single group of client machines 102, while server(s) 106 may be referred to as a single server 106 or a single group of servers 106. In one embodiment a single client machine 102 communicates with more than one server 106, while in another embodiment a single server 106 communicates with more than one client machine 102. In yet another embodiment, a single client machine 102 communicates with a single server 106.

A client machine 102 can, in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

In one embodiment, the client machine 102 can be a virtual machine 102C. The virtual machine 102C can be any virtual machine, while in some embodiments the virtual machine 102C can be any virtual machine managed by a hypervisor developed by XenSolutions, Citrix Systems, IBM, VMware, or any other hypervisor. In other embodiments, the virtual machine 102C can be managed by any hypervisor, while in still other embodiments, the virtual machine 102C can be managed by a hypervisor executing on a server 106 or a hypervisor executing on a client 102.

The client machine 102 can in some embodiments execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 102 that displays application output generated by an application remotely executing on a server 106 or other remotely located machine. In these embodiments, the client device 102 can display the application output in an application window, a browser, or other output window. In one embodiment, the application is a desktop, while in other embodiments the application is an application that generates a desktop.

The server 106, in some embodiments, executes a remote presentation client or other client or program that uses a thin-client or remote-display protocol to capture display output generated by an application executing on a server 106 and transmits the application display output to a remote client 102. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment 101 can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In embodiments where the server 106 comprises an appliance, the server 106 can be an appliance manufactured by any one of the following manufacturers: the Citrix Application Networking Group; Silver Peak Systems, Inc; Riverbed Technology, Inc.; F5 Networks, Inc.; or Juniper Networks, Inc. Some embodiments include a first server 106A that receives requests from a client machine 102, forwards the request to a second server 106B, and responds to the request generated by the client machine 102 with a response from the second server 106B. The first server 106A can acquire an enumeration of applications available to the client machine 102 and well as address information associated with an application server 106 hosting an application identified within the enumeration of applications. The first server 106A can then present a response to the client's request using a web interface, and communicate directly with the client 102 to provide the client 102 with access to an identified application.

The server 106 can, in some embodiments, execute any one of the following applications: a thin-client application using a thin-client protocol to transmit application display data to a client; a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server 106 that executes any one of the following types of hosted server applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 102 can, in some embodiments, be a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node can identify and provide address information associated with a server 106 hosting a requested application, to one or more clients 102 or servers 106. In still other embodiments, the master node can be a server farm 106, a client 102, a cluster of client nodes 102, or an appliance.

One or more clients 102 and/or one or more servers 106 can transmit data over a network 104 installed between machines and appliances within the computing environment 101. The network 104 can comprise one or more sub-networks, and can be installed between any combination of the clients 102, servers 106, computing machines and appliances included within the computing environment 101. In some embodiments, the network 104 can be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS; or any other protocol able to transmit data among mobile devices.

Figure 1B:
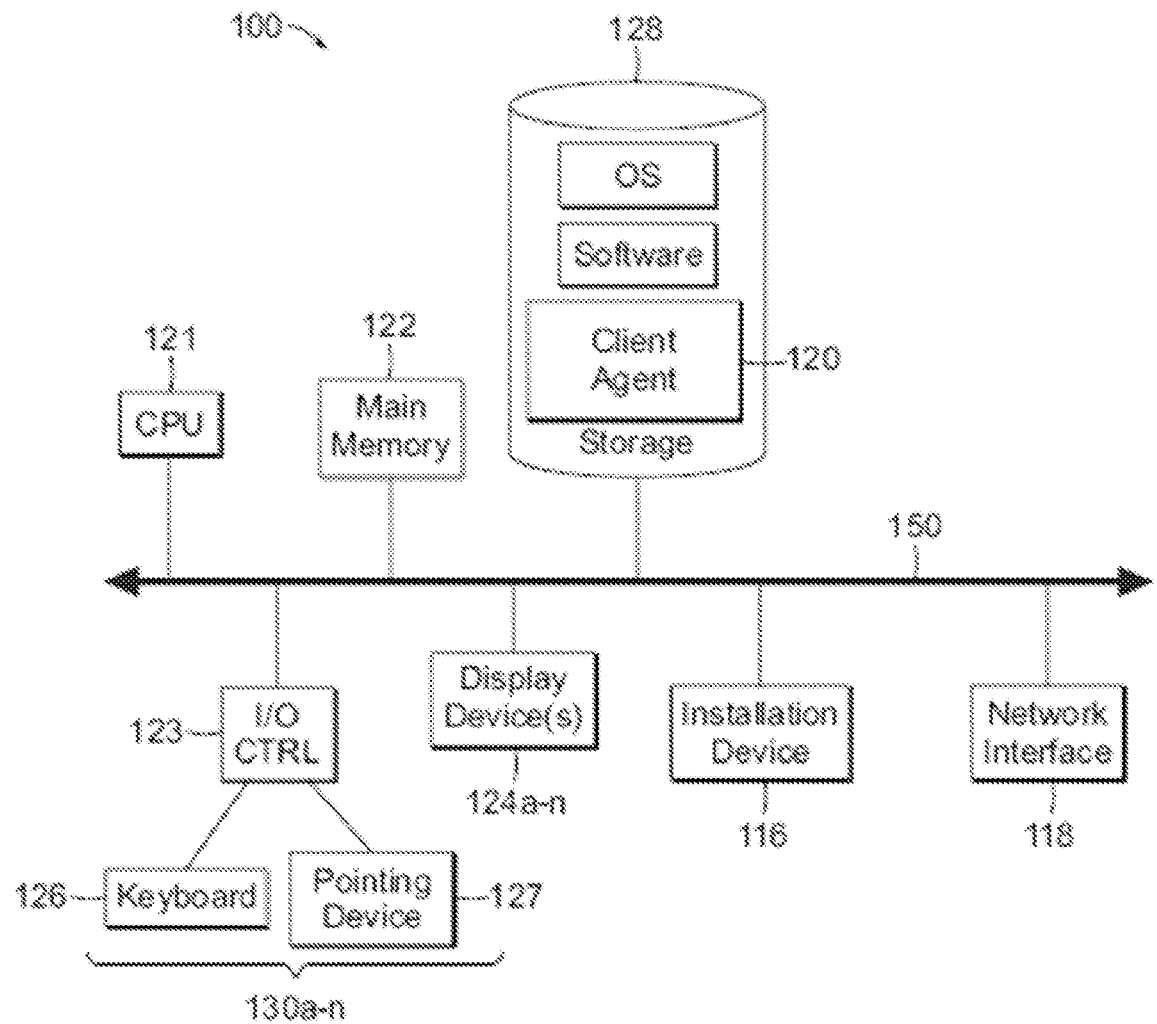
FIGS. 1B and 1C are block diagrams illustrative of an embodiment of computing machines for practicing the methods and systems described herein.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a key board 126, and a pointing device 127. Other embodiments may include an I/O controller 123 connected to more than one input/output device 130A-130N.

Figure 1C:
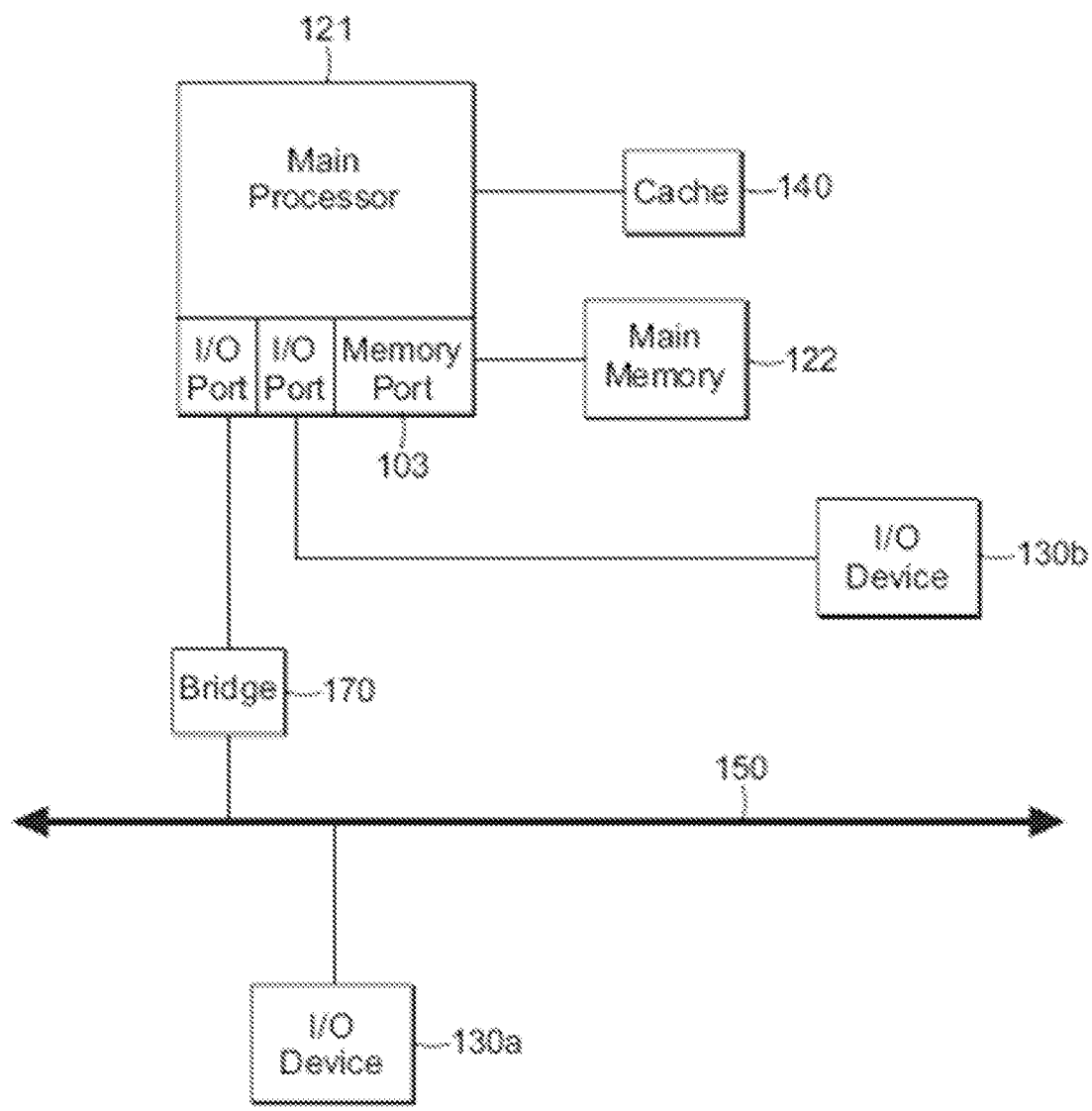

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the main central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 122 may include any combination of the following: a microprocessor, a microcontroller, a central processing unit with a single processing core, a central processing unit with two processing cores, or a central processing unit with more than one processing core.

While FIG. 1C illustrates a computing device 100 that includes a single central processing unit 121, in some embodiments the computing device 100 can include one or more processing units 121. In these embodiments, the computing device 100 may store and execute firmware or other executable instructions that, when executed, direct the one or more processing units 121 to simultaneously execute instructions or to simultaneously execute instructions on a single piece of data. In other embodiments, the computing device 100 may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 can include one or more processing cores. For example, the processing unit 121 may have two cores, four cores, eight cores, etc. In one embodiment, the processing unit 121 may comprise one or more parallel processing cores. The processing cores of the processing unit 121 may in some embodiments access available memory as a global address space, or in other embodiments, memory within the computing device 100 can be segmented and assigned to a particular core within the processing unit 121. In one embodiment, the one or more processing cores or processors in the computing device 100 can each access local memory. In still another embodiment, memory within the computing device 100 can be shared amongst one or more processors or processing cores, while other memory can be accessed by particular processors or subsets of processors. In embodiments where the computing device 100 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 100 includes one or more processing units 121, or a processing unit 121 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 100, in some embodiments, can include a graphics processor or a graphics processing unit (Not Shown). The graphics processing unit can include any combination of software and hardware, and can further input graphics data and graphics instructions, render a graphic from the inputted data and instructions, and output the rendered graphic. In some embodiments, the graphics processing unit can be included within the processing unit 121. In other embodiments, the computing device 100 can include one or more processing units 121, where at least one processing unit 121 is dedicated to processing and rendering graphics.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O device 130A-130N. In some embodiments, the local system bus 150 can be any one of the following types of buses: a VESA VL bus; an ISA bus; an EISA bus; a Micro-Channel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121. Still other versions of the computing machine 100 include a processor 121 connected to an I/O device 130A-130N via any one of the following connections: HyperTransport, Rapid I/O, or InfiniBand. Further embodiments of the computing machine 100 include a processor 121 that communicates with one I/O device 130A using a local interconnect bus and a second I/O device 130B using a direct connection.

The computing device 100, in some embodiments, includes a main memory unit 122 and cache memory 140. The cache memory 140 can be any memory type, and in some embodiments can be any one of the following types of memory: SRAM; BSRAM; or EDRAM. Other embodiments include cache memory 140 and a main memory unit 122 that can be any one of the following types of memory: Static random access memory (SRAM), Burst SRAM or Synch-Burst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 121 that can access the main memory 122 via: a system bus 150; a memory port 103; or any other connection, bus or port that allows the processor 121 to access memory 122.

One embodiment of the computing device 100 provides support for any one of the following installation devices 116: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

The computing device 100 may further include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments include an I/O device 130 that may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 100 can connect to multiple display devices 124A-124N, in other embodiments the computing device 100 can connect to a single display device 124, while in still other embodiments the computing device 100 connects to display devices 124A-124N that are the same type or form of display, or to display devices that are different types or forms. Embodiments of the display devices 124A-124N can be supported and enabled by the following: one or multiple I/O devices 130A-130N; the I/O controller 123; a combination of I/O device(s) 130A-130N and the I/O controller 123; any combination of hardware and software able to support a display device 124A-124N; any type and/or form of video adapter, video card, driver, and/or library to interface, communicate, connect or otherwise use the display devices 124A-124N. The computing device 100 may in some embodiments be configured to use one or multiple display devices 124A-124N, these configurations include: having multiple connectors to interface to multiple display devices 124A-124N; having multiple video adapters, with each video adapter connected to one or more of the display devices 124A-124N; having an operating system configured to support multiple displays 124A-124N; using circuits and software included within the computing device 100 to connect to and use multiple display devices 124A-124N; and executing software on the main computing device 100 and multiple secondary computing devices to enable the main computing device 100 to use a secondary computing device's display as a display device 124A-124N for the main computing device 100. Still other embodiments of the computing device 100 may include multiple display devices 124A-124N provided by multiple secondary computing devices and connected to the main computing device 100 via a network.

In some embodiments, the computing machine 100 can execute any operating system, while in other embodiments the computing machine 100 can execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In still another embodiment, the computing machine 100 can execute multiple operating systems. For example, the computing machine 100 can execute PARALLELS or another virtualization platform that can execute or manage a virtual machine executing a first operating system, while the computing machine 100 executes a second operating system different from the first operating system.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95cl, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. In still other embodiments, the computing device 100 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; or any other handheld mobile device.

Figure 1D:
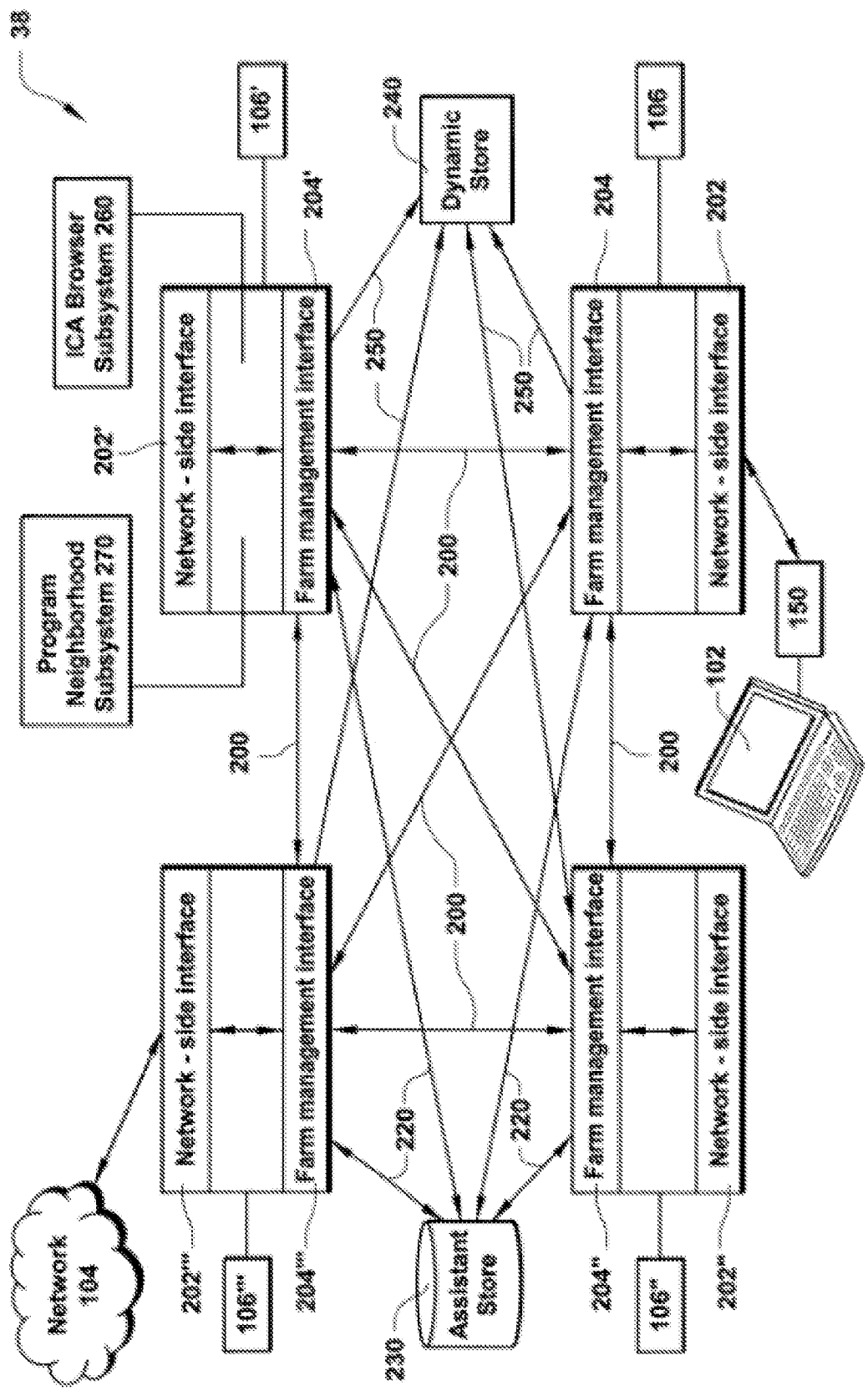
FIG. 1D is a block diagram depicting an embodiment of a server farm.

Referring now to FIG. 1D, together the servers 106 comprise a farm 38 or server farm, where each server 106 can include a network-side interface 202 and a farm-side interface 204. The network-side interface 202 can be in communication with one or more clients 102 or a network 104. The network 104 can be a WAN, LAN, or any other embodiment of a network such those networks described above.

Each server 106 has a farm-side interface 204 connected with one or more farm-side interface(s) 204 of other servers 106 in the farm 38. In one embodiment, each farm-side interface 204 is interconnected to other farm-side interfaces 204 such that the servers 106 within the farm 38 may communicate with one another. On each server 106, the farm-side interface 204 communicates with the network-side interface 202. The farm-side interfaces 204 can also communicate (designated by arrows 220) with a persistent store 230 and, in some embodiments, with a dynamic store 240. The combination of servers 106, the persistent store 230, and the dynamic store 240, when provided, are collectively referred to as a farm 38. In some embodiments, a server 106 communicates with the persistent store 230 and other servers 106' communicate with the server 106 to access information stored in the persistent store.

The persistent store 230 may be physically implemented on a disk, disk farm, a redundant array of independent disks (RAID), writeable compact disc, or any other device that allows data to be read and written and that maintains written data if power is removed from the storage device. A single physical device may provide storage for a plurality of persistent stores, i.e., a single physical device may be used to provide the persistent store 230 for more than one farm 38. The persistent store 230 maintains static data associated with each server 106 in farm 38 and global data used by all servers 106 within the farm 38. In one embodiment, the persistent store 230 may maintain the server data in a Lightweight Directory Access Protocol (LDAP) data model. In other embodiments, the persistent store 230 stores server data in an ODBC-compliant database. For the purposes of this description, the term "static data" refers to data that do not change frequently, i.e., data that change only on an hourly, daily, or weekly basis, or data that never change. Each server uses a persistent storage subsystem to read data from and write data to the persistent store 230.

The data stored by the persistent store 230 may be replicated for reliability purposes physically or logically. For example, physical redundancy may be provided using a set of redundant, mirrored disks, each providing a copy of the data. In other embodiments, the database itself may be replicated using standard database techniques to provide multiple copies of the database. In further embodiments, both physical and logical replication may be used concurrently.

The dynamic store 240 (i.e., the collection of all record tables) can be embodied in various ways. In one embodiment, the dynamic store 240 is centralized; that is, all runtime data are stored in the memory of one server 106 in the farm 38. That server operates as a master network node with which all other servers 106 in the farm 38 communicate when seeking access to that runtime data. In another embodiment, each server 106 in the farm 38 keeps a full copy of the dynamic store 240. Here, each server 106 communicates with every other server 106 to keep its copy of the dynamic store 240 up to date.

In another embodiment, each server 106 maintains its own runtime data and communicates with other servers 106 when seeking to obtain runtime data from them. Thus, for example, a server 106 attempting to find an application program requested by the client 102 may communicate directly with every other server 106 in the farm 38 to find one or more servers hosting the requested application.

For farms 38 having a large number of servers 106, the network traffic produced by these embodiments can become heavy. One embodiment alleviates heavy network traffic by designating a subset of the servers 106 in a farm 38, typically two or more, as "collector points." Generally, a collector point is a server that collects run-time data. Each collector point stores runtime data collected from certain other servers 106 in the farm 38. Each server 106 in the farm 38 is capable of operating as, and consequently is capable of being designated as, a collector point. In one embodiment, each collector point stores a copy of the entire dynamic store 240. In another embodiment, each collector point stores a portion of the dynamic store 240, i.e., it maintains runtime data of a particular data type. The type of data stored by a server 106 may be predetermined according to one or more criteria. For example, servers 106 may store different types of data based on their boot order. Alternatively, the type of data stored by a server 106 may be configured by an administrator using an administration tool (Not Shown.) In these embodiments, the dynamic store 240 is distributed amongst two or more servers 106 in the farm 38.

Servers 106 not designated as collector points know the servers 106 in a farm 38 that are designated as collector points. A server 180 not designated as a collector point may communicate with a particular collector point when delivering and requesting runtime data. Consequently, collector points lighten network traffic because each server 106 in the farm 38 communicates with a single collector point server 106, rather than with every other server 106, when seeking to access the runtime data.

Each server 106 can operate as a collector point for more than one type of data. For example, server 106" can operate as a collector point for licensing information and for loading information. In these embodiments, each collector point may amass a different type of run-time data. For example, to illustrate this case, the server 106'" can collect licensing information, while the server 106" collects loading information.

In some embodiments, each collector point stores data that is shared between all servers 106 in a farm 38. In these embodiments, each collector point of a particular type of data exchanges the data collected by that collector point with every other collector point for that type of data in the farm 38. Thus, upon completion of the exchange of such data, each collector point 106" and 106 possesses the same data. Also in these embodiments, each collector point 106 and 106" also keeps every other collector point abreast of any updates to the runtime data.

Browsing enables a client 102 to view farms 38, servers 106, and applications in the farms 38 and to access available information such as sessions throughout the farm 38. Each server 106 includes an ICA browsing subsystem 260 to provide the client 102 with browsing capability. After the client 102 establishes a connection with the ICA browser subsystem 260 of any of the servers 106, that browser subsystem supports a variety of client requests. Such client requests include: (1) enumerating names of servers in the farm, (2) enumerating names of applications published in the farm, (3) resolving a server name and/or application name to a server address that is useful the client 102. The ICA browser subsystem 260 also supports requests made by clients 10 running a program neighborhood application that provides the client 102, upon request, with a view of those applications within the farm 38 for which the user is authorized. The ICA browser subsystem 260 forwards all of the above-mentioned client requests to the appropriate subsystem in the server 106.

In one embodiment, each server 106 in the farm 38 that has a program neighborhood subsystem 270 can provide the user of a client 102 with a view of applications within the farm 38. The program neighborhood subsystem 270 may limit the view to those applications for which the user of the client 102 has authorization to access. Typically, this program neighborhood service presents the applications to the user as a list or a group of icons.

The functionality provided by the program neighborhood subsystem 270 can be available to two types of clients, (1) program neighborhood-enabled clients that can access the functionality directly from a client desktop, and (2) non-program neighborhood-enabled clients (e.g., legacy clients) that can access the functionality by running a program neighborhood-enabled desktop on the server.

Communication between a program neighborhood-enabled client and the program neighborhood subsystem 270 may occur over a dedicated virtual channel that is established on top of an ICA virtual channel. In other embodiments, the communication occurs using an XML service. In one of these embodiments, the program neighborhood-enabled client communicates with an XML subsystem, such as the XML service 516 described in connection with FIG. 6 below, providing program neighborhood functionality on a server 106.

In one embodiment, the program neighborhood-enabled client does not have a connection with the server with a program neighborhood subsystem 270. For this embodiment, the client 102 sends a request to the ICA browser subsystem 260 to establish an ICA connection to the server 106 in order to identify applications available to the client 102. The client 102 then runs a client-side dialog that acquires the credentials of a user. The credentials are received by the ICA browser subsystem 260 and sent to the program neighborhood subsystem 270. In one embodiment, the program neighborhood subsystem 270 sends the credentials to a user management subsystem for authentication. The user management subsystem may return a set of distinguished names representing the list of accounts to which the user belongs. Upon authentication, the program neighborhood subsystem 270 establishes the program neighborhood virtual channel. This channel remains open until the application filtering is complete.

The program neighborhood subsystem 270 then requests the program neighborhood information from the common application subsystem 524 associated with those accounts. The common application subsystem 524 obtains the program neighborhood information from the persistent store 230. On receiving the program neighborhood information, the program neighborhood subsystem 270 formats and returns the program neighborhood information to the client over the program neighborhood virtual channel. Then the partial ICA connection is closed.

For another example in which the program neighborhood-enabled client establishes a partial ICA connection with a server, consider the user of the client 102 who selects a farm 38. The selection of the farm 38 sends a request from the client 102 to the ICA browser subsystem 260 to establish an ICA connection with one of the servers 106 in the selected farm 38. The ICA browser subsystem 260 sends the request to the program neighborhood subsystem 270, which selects a server 106 in the farm 38. Address information associated with the server 106 is identified and returned to the client 102 by way of the ICA browser subsystem 260. The client 102 can then subsequently connect to the server 106 corresponding to the received address information.

In another embodiment, the program neighborhood-enabled client 102 establishes an ICA connection upon which the program neighborhood-virtual channel is established and remains open for as long as the ICA connection persists. Over this program neighborhood virtual channel, the program neighborhood subsystem 270 pushes program neighborhood information updates to the client 102. To obtain updates, the program neighborhood subsystem 270 subscribes to events from the common application subsystem 524 to allow the program neighborhood subsystem 270 to detect changes to published applications.

Figure 1E:
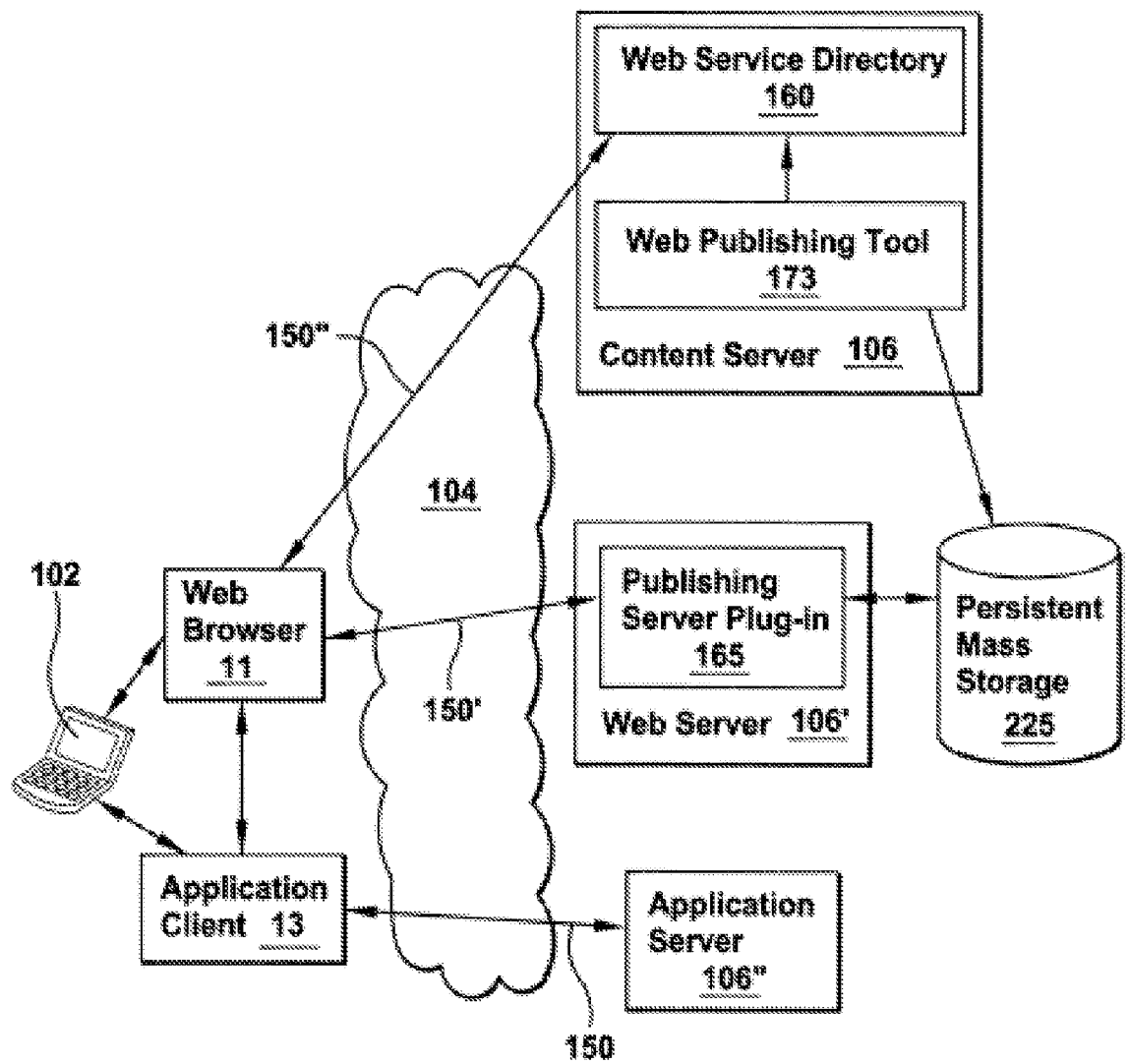
FIG. 1E is a block diagram depicting one embodiment of a system for providing a plurality of application programs available to the client via publishing of GUIs in a web service directory.

Referring to FIG. 1E, a block diagram depicts another embodiment of a system architecture for providing a plurality of application programs available to the client via publishing of GUIs in a web service directory. The system includes the client 102, and a plurality of servers 106. A first server 106 functions as a content server. A second server 106' provides web server functionality, and a third server 106" provides functionality for providing access to application files and acts as an application server or a file server. The client 102 can download content from the content server 106, the web server 106', and the application server 106" over the network 104. In one embodiment, the client 102 can download content (e.g., an application) from the application server 106" over the client-application server communication channel 150.

In one embodiment, the web browser 11 on the client 102 uses Secure Socket Layer (SSL) support for communications to the content server 106 and/or the web server 106'. SSL is a secure protocol developed by Netscape Communication Corporation of Mountain View, Calif., and is now a standard promulgated by the Internet Engineering Task Force (IETF). The web browser 11 can alternatively connect to the content server 106 and/or the web server 106' using other security protocols, such as, but not limited to, Secure Hypertext Transfer Protocol (SHTTP) developed by Terisa Systems of Los Altos, Calif., HTTP over SSL (HTTPS), Private Communication Technology (PCT) developed by Microsoft Corporation of Redmond, Wash., and the Transport Level Security (TLS) standard promulgated by the IETF. In other embodiments, the web browser 11 communicates with the servers 106 using a communications protocol without encryption, such as the HyperText Transfer Protocol (HTTP).

The client 102 can additionally include an application client 13 for establishing and exchanging communications with the application server 106" over the client-application server communication channel 150. In one embodiment, the application client 13 is a GUI application. In some embodiments, the application client 13 is an Independent Computing Architecture (ICA) client, developed by Citrix Systems, Inc. of Fort Lauderdale, Fla., and is also referred to below as ICA client 13. Other embodiments of the application client 13 include a Remote Display Protocol (RDP) client, developed by Microsoft Corporation of Redmond, Wash., an X-Windows client 13, a client-side player, interpreter or simulator capable of executing multimedia applications, email, Java, or .NET code. Moreover, in one embodiment the output of an application executing on the application server 106" can be displayed at the client 102 via the ICA client 13. In some embodiments, the application client 13 is an application client such as the application streaming client 552, described in greater detail in connection with FIG. 5.

The client 102 searches the web service directory 160 for a web service. In one embodiment, the search is a manual search. Alternatively, the search is an automatic search. The web service directory 160 may also provide a service based view, such as white and yellow pages, to search for web services in the web service directory. In another embodiment, the web service directory 160 supports a hierarchical browsing based on a structured service name and service kind for GUI applications. In one embodiment, the web service directory 160 executes on a server independent of the content server 106, such as a directory server. In other embodiments, the web service directory 160 executes on multiple servers.

In some embodiments, the content server 106 enables the client 102 to select web services based on additional analysis or information by providing this information or analysis in the web service directory 160. Examples of service information that the web service directory 160 can list includes, but is not limited to, the name of the business offering the service, the service type, a textual description of the service, one or more service access points (SAPs), the network type, the path to use (e.g., TCP or HTTPS), and quality of service (QoS) information. Moreover, service information can be client device type or user (e.g., role) specific. Thus, service selection can be based on one or more of the above attributes.

In one embodiment, the service type denotes a programming interface that the client 102 must use to access the web service. For instance, the service type can state that the service is encoded by an interface description language, such as Web Services Description Language (WSDL).

The service access point, or SAP, is a unique address for an application. The SAPs enable the computer system to support multiple applications at the client 102 and each server 106. For example, the application server 106" may support an electronic mail (i.e., e-mail) application, a file transfer application, and/or a GUI application. In one embodiment, these applications would each have a SAP that is unique within the application server 106". In one embodiment, the SAP is a web or Internet address (e.g., Domain Name System (DNS) name, IP/port, or Uniform Resource Locator (URL)). Thus, in one embodiment the SAP identifies the address of the web server 106' as part of the address for an application stored on the web server 106'. In some embodiments, the SAP identifies the address of a publishing server plug-in 165 as part of the address for an application stored on the web server 106', as described below. In one embodiment, the SAP is an "accessPoint" from the UDDI registry.

To prepare an item for publishing in the web service directory 160, the content server 106 includes a web publishing tool 170. In one embodiment, the web publishing tool 173 is a software module. Alternatively, the web publishing tool 173 is another server that may be externally located from or internally located in the content server 106.

In one embodiment, the web server 106' delivers web pages to the client 102. The web server 106' can be any server 106 capable of providing web pages to the client 102. In another embodiment, the web server 106' is an Enterprise Information Portal (e.g., corporate Intranet or secured business-to-business extranet). Enterprise portals are company web sites that aggregate, personalize and serve applications, data and content to users, while offering management tools for organizing and using information more efficiently. In some companies, portals have replaced traditional desktop software with browser-based access to a virtual workplace.

The web server 106' can also include a publishing server plug-in 165 to enable the publishing of graphical user interface (GUI) applications. More specifically, the publishing server plug-in 165 translates a new web service entry URL into a GUI application service so that the GUI can be accessed via the web service directory 160. In one embodiment, the publishing server plug-in 165 is a Common Gateway Interface (CGI) script, which is a program designed to accept and return data that conforms to the CGI specification. The program can be written in any programming language, such as C, Perl, Java, or Visual Basic. In another embodiment, the publishing server plug-in 165 is a Java Server Page (JSP). Using the publishing server plug-in 165 to facilitate the publishing of remote GUI applications, the client 102 can thereby access the web service, not through a programming interface or a web page, but through a full GUI interface, such as with Citrix's ICA or Microsoft's RDP.

The application server 106" hosts one or more applications that are available for the client 102. Examples of such applications include word processing programs such as MICROSOFT WORD and spreadsheet programs such as MICROSOFT EXCEL, both manufactured by Microsoft Corporation of Redmond, Wash., financial reporting programs, customer registration programs, programs providing technical support information, customer database applications, or application set managers.

In some embodiments, one or more communication links 150 are established over different networks. For example, the client-content server communication channel 150' can belong to a first network (e.g., the World Wide Web) and the client-web server communication channel 150" can belong to a second network (e.g., a secured extranet or Virtual Private Network (VPN)).

In one embodiment, the web publishing tool 173 stores information about an application that the web publishing tool 173 is currently publishing in the web service directory 160 in a persistent mass storage 225. In one embodiment the information is a URL for the dynamic publishing server plug-in 165. The persistent mass storage 225 may be a magnetic disk or magneto-optical drive. In one embodiment, the persistent mass storage 225 is a database server, which stores data related to the published application in one or more local service databases. The persistent mass storage 225 may be a component internally located in or externally located from any or all of the servers 106.

In other embodiments, the content server 106 or the web server 106' communicate with a server 106 in the farm 38 to retrieve the list of applications. In one of these embodiments, the content server 106 or the web server 106' communicate with the farm 38 instead of with the persistent mass storage 225.

Figure 2B:
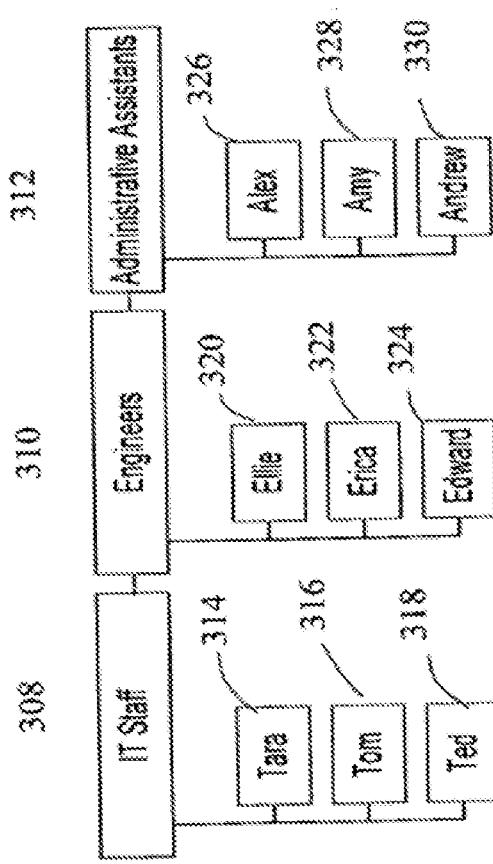
FIG. 2B is a diagram of a set of computer network user groupings according to an illustrative embodiment of the invention.
Figure 2A:
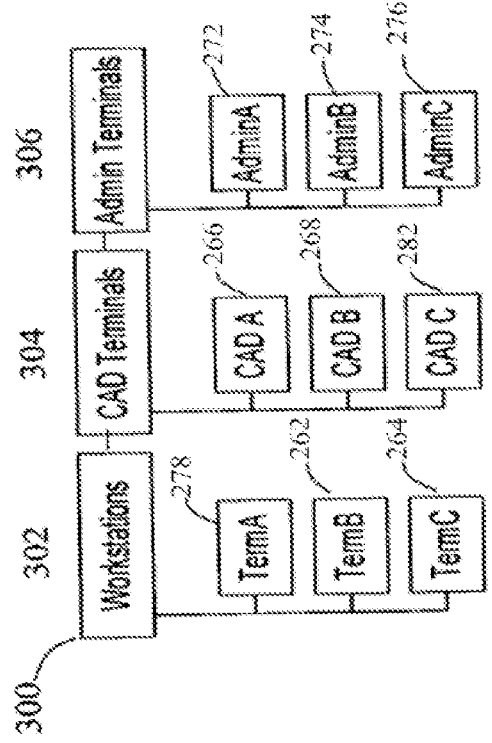
FIG. 2A is a diagram of a set of computer network resource groupings according to an illustrative embodiment of the invention.

Referring to FIG. 2A and FIG. 2B, to ease the burden on system administrators, system administrators may use the access administration system 226 or one of its constituent systems to aggregate users and resources into groups that share common characteristics, since as the number of network resources and users of a computer system 200 increases, it becomes increasingly time consuming to individually assign access rights to each user. Referring to FIG. 3A, an illustrative set 300 of network resources of the computer system 200 may be grouped into Workstations 302 which includes TermA 202, TermB 204, and TermC 206; CAD Terminals 304 which includes CAD A 214, CAD B, 216, and CAD C 218; and Administrative Assistant Terminals AdminA 208, AdminB 210 and AdminC 212. Referring to FIG. 3B, an illustrative set 307 of computer users may be grouped as follows: Tara 314, Tom 316, and Ted 318 may be grouped as members of the Information Technology (IT) Staff 308; Ellie 320, Erica 322, and Edward 324 may grouped as Engineers 310, and Alex 326, Amy 328, and Andrew 330 may be grouped as Administrative Assistants 312.

In one embodiment, a system administrator may specify groupings of users and/or resources using the access administration system 226. In one embodiment, the access administration system 226 provides a graphical user interface with which a system administrator may drag and drop, or point-and-click to add users or resources to groups. In another embodiment, the enrollment administration system 228 also provides group-management functionality via a similar interface. The groups created for the purposes of specifying enrollment rules may be different from the groups created for specifying other access rules.

After groups of users and resources are defined, rules may be specified to limit the ability of a group of users 308, 310, or 312 to both directly and/or remotely access and use a group of network resources 302, 304, and 306. For example, since members 314, 316, and 318 of the IT staff 308 are responsible for maintaining the computers 202, 204, 206, 208, 210, 212, 214, 216, and 218, a system administrator would likely want to give the of IT Staff 308 access to all of the computers 202, 204, 206, 208, 210, 212, 214, 216, and 218. In contrast, a system administrator may want to limit Administrative Assistants 312 to only be able to access the Administrative Assistant Terminals with lesser capabilities. Engineers 310 may be granted access to Workstations 302 and CAD Terminals 304, but not to the Administrative Assistant Terminals 306 used by Administrative Assistants 312.

In one embodiment, a system administrator may restrict the ability of a user to remotely access a networked resource without specifying individual user/resource limitations. As mentioned above, the computer system 200 operates under a presumption that a computer user should only be able to remotely access a computer to which the user is capable of achieving direct physical access. If a user does not have physical access to a networked resource, that user should not be able to circumvent physical security measures by accessing the networked resource remotely. Here, physical access means access to an input device (such as a keyboard, mouse, trackball, microphone, touchscreen, joystick, etc.) connected to a console that is physically attached to the networked resource. Connection may include wireless communication in the case where input devices communicate with a resource using a short range wireless signal (e.g., a wireless keyboard or mouse). In a simple example, Engineers 310, in general, have access to CAD Terminals 304 but only in the buildings in which they work. Engineer Ellie 320, working in the second building 222, does not have physical access to CAD C 212, because it is located in the first building 220. Likewise, if Ellie keeps her Workstation 302, TermA 402, in a locked office for privacy or security reasons, other users will not have physical access to that workstation 302.

According to an embodiment of the invention, to enforce this extension of physical access limitations into the remote access environment, the computer system 200 includes the enrollment functionality described above. Namely, a user cannot gain remote access to a networked resource of the computer system 200 if the user has not first enrolled the networked resource. Preferably, a user may only enroll a networked resource if the user requests enrollment using an input device (e.g., keyboard, mouse, microphone, display, etc.) connected to a console that is physically attached to the networked resource. As such, if a user cannot physically access such an input device, the user will not be able to enroll the network resource and will not be able to access the networked resource remotely.

In one such embodiment, not all users who have direct physical access to a computer may enroll the computer. Enrollment rules specify which users or groups of users are authorized to enroll which networked resources or groups of networked resources. Preferably, the enrollment rules are specified at a user/resource group level rather than at an individual user/resource level, for purposes of efficiency. The groups may be the same groups as used for specifying other access rules or the groups may be different.

Referring to FIG. 3A, a table 400 depicts illustrative enrollment rules, where rows represent groups of users 308, 310, and 312, and columns represent groups of networked resources 302, 304, and 306. A system administrator specifies enrollment rules, for example using the enrollment administration system 228. To do so, the system administrator defines a plurality of groups of users 308, 310, and 312 and also defines groups of networked resources 302, 304, and 306 as described above with respect to FIGS. 2A and 2B. The system administrator then specifies which groups of users may enroll which groups of networked resources. For example, in the table 400, a system administrator has specified that IT staff members 308 can enroll Workstations 302, CAD Terminals 304, and Administrative Assistant Terminals 306 as indicated by the "X"s at the intersections of the IT Staff 308 row and the columns for each of the groups of networked resources. Similarly, Engineers 310 can enroll Workstations 302 and CAD Terminals 304, and Administrative Assistants 312 can only enroll Administrative Assistant Terminals 306.

It should be understood that these rules may be specified in a table form as just described, but also or instead through use of commands, data lists, data files, XML tags or any other suitable mechanism for rule specification.

Using the enrollment administration system 228, system administrators can readily alter enrollment rules once specified. For example, to reflect changes in staffing (e.g., the firing, hiring or shifting of an employee) the system administrator may add or remove users to and from user groups. The same may be done for networked resource groups. Policy decisions affecting entire groups may be implemented by changing the groups of networked resources that a group of users is permitted to enroll. For example, if the system administrator that specified the enrollment rules in the table 400 decided that Administrative Assistants 312 should also be able to enroll all workstations, the rule for Administrative Assistants 312 may be altered accordingly. In the case that a system administrator removes the ability of one or more users, or groups of users to enroll one or more network resources, the users affected will no longer be able to enroll those networked resources. In some embodiments, if the networked resources were already enrolled by the affected users, the change in the enrollment rule may cause the networked resources to be unenrolled.

Figure 4:
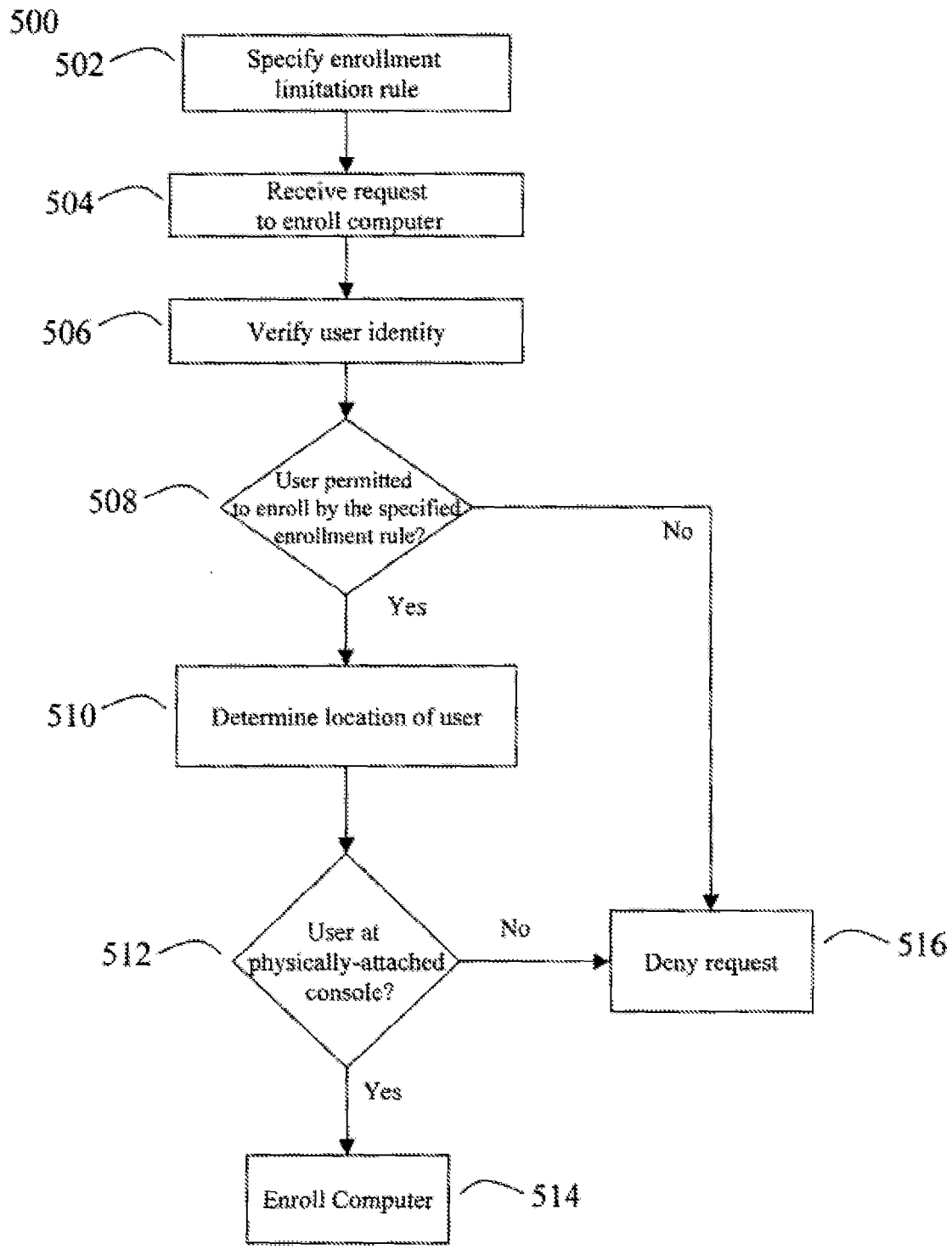
FIG. 4 is a flow chart of a method for enrolling a networked resource according to an illustrative embodiment of the invention.

Referring to FIG. 4, a flow chart of a method 500 of enrolling a networked resource (e.g., computers 202, 204, 206, 208, 210, 212, 214, 216, and 218) begins with specification of enrollment rules (step 502), for example by a system administrator as described above. When a user requests to enroll a networked resource (step 504), the enrollment system 230 verifies the identity of the user (step 506). Identity verification (step 506) may be achieved through any identity authentication means, including for example, user-password or PIN authentication, biometric identification, voice identification, etc.

The enrollment system 230 and the enrollment administration system 228 determine whether the user is permitted by the enrollment rules to enroll the networked resource that the user is requesting to enroll (step 508). In the illustrative embodiment, the enrollment system 230 sends an enrollment request to the enrollment administration system 228. The enrollment request includes the identification of the networked resource that the user is requesting to enroll and the identification of the user. The enrollment administration system 228 then compares the networked resource/user pairing with the enrollment rules to determine if the user is a member of a group that has permission to enroll any of the networked resources of the group to which the networked resource in question belongs.

Single-use copies of the enrollment rules may be downloaded to the networked resource from the enrollment administration system 228 each time a user attempts to enroll a networked resource, and in other implementations a networked resource may maintain a persistent set of enrollment rules that is updated by the enrollment administration system 228 when a system administrator alters the enrollment rules. In either of these cases, the permission verification (step 508) is carried out on the networked resource.

If the user is permitted to enroll the networked resource based on the enrollment rules, the location of the user is determined (step 510). In one embodiment, a locator system determines the location of the user by retrieving the IP address of the networked resource from which the enrollment request was sent, typically included in the header of the packets that made up the communication, and executing a reverse Domain Name Server (DNS) look-up routine to determine the source of the request. The enrollment administration system 228 then determines whether the user requested enrollment of the networked resource from a console that is physically attached to networked resource the user is requesting to enroll (step 512) by comparing the determined enrollment request source with the networked resource that is identified in the enrollment request. In another embodiment, the locator system transmits to, and causes the execution of a Java® applet or ActiveX® control on the requested resource to determine whether the user is actually logged in to a console that is physically attached to the resource. In a further embodiment, the source of the request may be verified by transmitting to, and causing the execution of a Java® applet or ActiveX® control on the source of the request that forces the source to identify itself. The enrollment administration system 228 then compares the forced identification with the network resource the user requested to enroll. In one embodiment, the enrollment administration system carries out a combination of two or more of the above listed verification methods to ensure a robust request source identification.

If it is determined that the user sent the enrollment request from a console that is physically attached to the networked resource that the user is requesting to enroll (step 512), the enrollment administration system 228 enrolls the networked resource for the user (step 514) by updating an enrollment database. (See FIG. 6 below). If the user is not permitted to enroll the networked resource based on the enrollment rules, or it is determined that the user is attempting to enroll the computer from a remote location, enrollment is denied (step 516).

In an alternative embodiment, the enrollment administration system 228 determines the location of the user and verifies that the user is requesting enrollment of the networked resource from which the enrollment request originated before determining whether the user is permitted to enroll the networked resource according to the enrollment rules. In a further embodiment, the enrollment administration system 228 enables a system administrator to specify enrollment rules that allow a group of users to remotely enroll networked resources or to specify groups of resources that may be enrolled remotely. For example, in one embodiment, enrollment rules allow a user to enroll a file server (or a portion of a file server) that is part of a secure network from a console that is a part of that secure network but that is not physically attached to the file server.

Referring to FIG. 5, the enrollment administration system 228 maintains the information about enrolled resources and users. This storage may be implemented in many ways, including in the form of data files in a database. As shown in the illustrative depiction of the contents of an enrollment database 600, in the figure, the database 600 stores enrollment data for each individual user and each networked resource. When a user successfully enrolls a networked resource (step 514), the enrollment is stored in the enrollment database 600. For example, according to the enrollment database 600, engineer Ellie 320 has enrolled TermA, CAD A and CAD B. The table is consulted when a user attempts to remotely access a networked resource.

Figure 6:
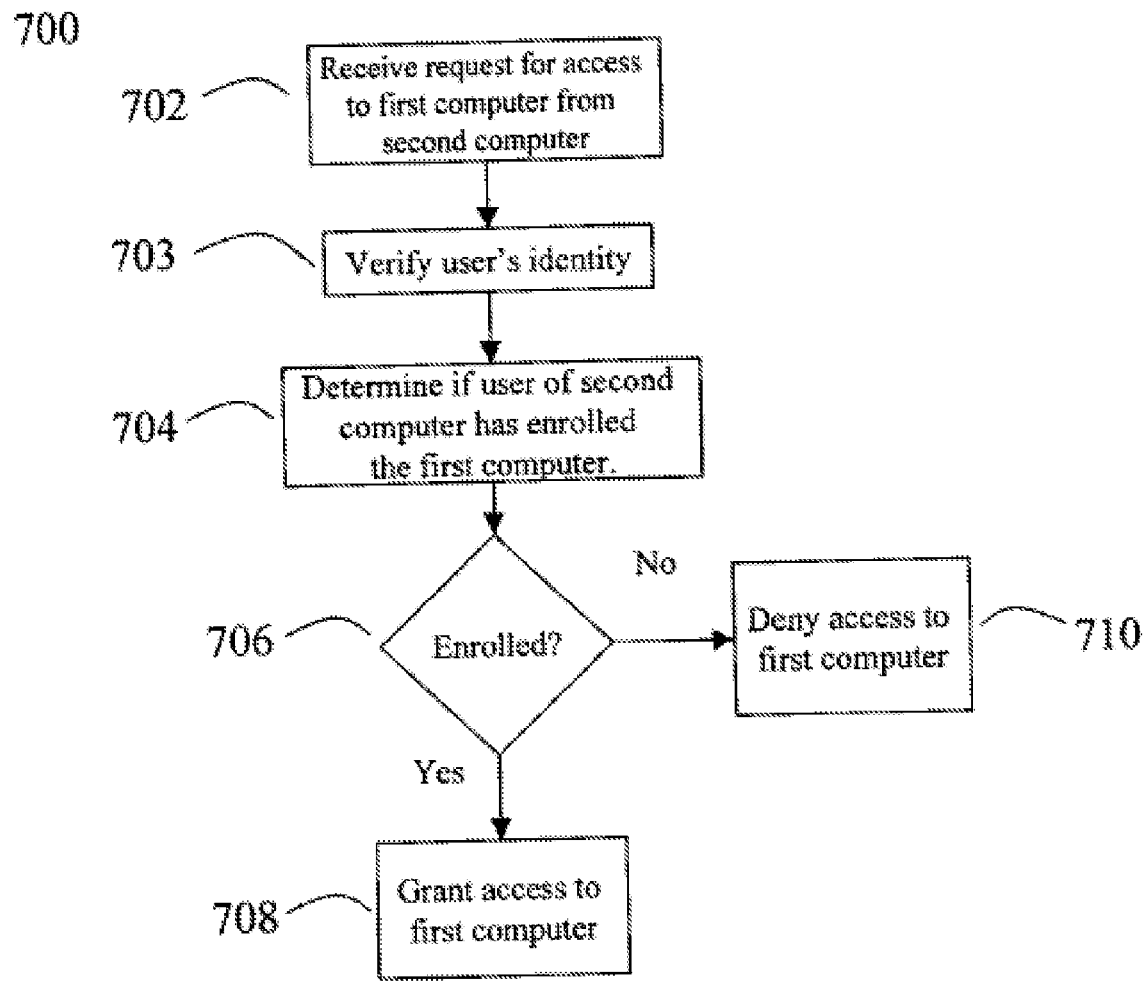
FIG. 6 is a flow chart of a method of granting remote access to a computer according to an illustrative embodiment of the invention.

Referring to FIG. 6, a method 700 of granting remote access to a networked resource includes querying the enrollment database for example, the enrollment database 600. When a user attempts to remotely access the first networked resource 100, the request for access is received by the remote access system 232 (step 702). The remote access system 232 verifies the identification of the user (step 703), also referred to as authentication. As described above in relation to verifying an identity of a user in the enrollment context, the remote access system 232 may authenticate a user using any suitable identity authentication means, including user name-password/PIN pairs, certificates, biometric data, one time keys, voice samples, etc. The remote access system 232 then determines whether the user has previously enrolled the first networked resource 100 (step 706). If the user has previously enrolled the first networked resource, the remote access system 232 grants access to the first networked resource 100 (step 708), otherwise the remote access system 232 denies remote access to the first networked resource 100.

In alternative embodiments, a system administrator could set additional remote access rules that limit which remote devices users may use to remotely access networked resources. For example, a system administrator may specify a rule that only allows users or groups of users to remotely access networked resources or a group of networked resources from a networked resource directly connected to the computing system 200. Under such a rule, Tara 314, for example, who according to the enrollment database 600 has enrolled AdminC 218, could remotely access AdminC 218 from AdminA 214, but Ted 318, who also has enrolled AdminC 218 could not remotely access AdminC from remote device 102.

Figure 7A:
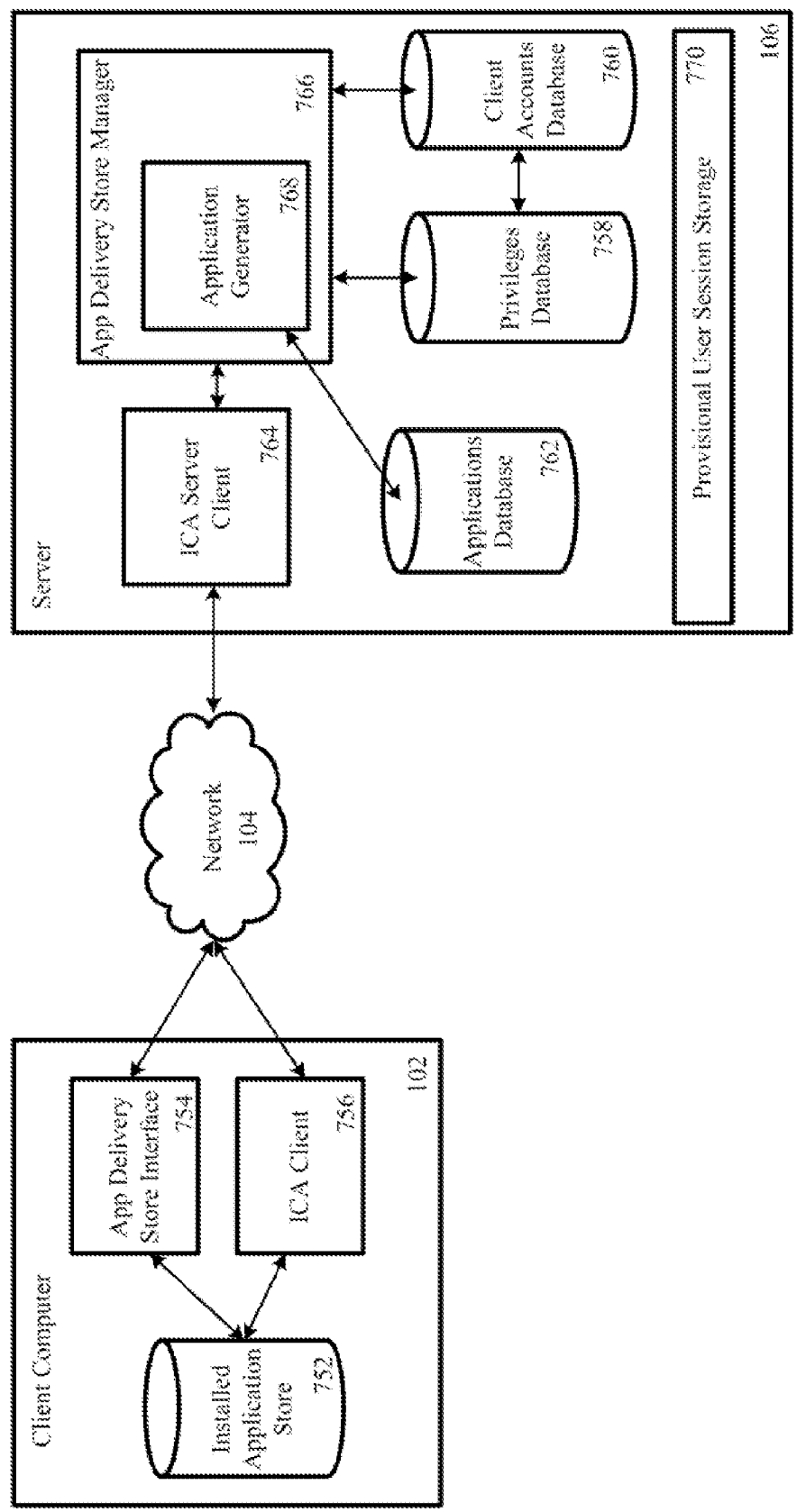
FIG. 7A is a block diagram of an embodiment of a system for delivering an interactive application store.

Illustrated in FIG. 7A is an embodiment of a system that can provide users with an application store. Included within the system is a client 102 that can communicate with a server 106 via a network 104. The client 102 can comprise an installed application store 752, an application delivery store interface 754, and a communication client 756. Each of the application delivery store interface 754 and the communication client 756 execute on the client 102 and each of the application delivery store interface 754 and the communication client 756 communicate with each other and with the installed application store 752. Both the application delivery store interface 754 and the communication client 756 can communicate with components on the server 106 via the network 104. The server 106 can comprise a server communication client 764 communicating with an application delivery store manager 766 which further communicates with an application database 762, a privileges database 758 and a client accounts database 760. In one embodiment, an application generator 768 executes within the application delivery store manager 766 and communicates directly with the applications database 762. Further included on the server 106 is a provisional user session storage 770.

Further referring to FIG. 7A, and in more detail, in one embodiment the client 102 can be any of the clients described herein. Similarly, in some embodiments the server 106 can be any of the servers described herein. The client 102 can communicate with the server 106 via the network and over a communication channel. In some embodiments, the client 102 can communicate with the server 106 via the ICA protocol. The network 104 can, in some embodiments, comprise any of the networks described herein.

In one embodiment, included on the client 102 is an installed application store 752 that can in some embodiments communicate with both the ICA client 756 and the application delivery store interface 754. In one embodiment, the installed application store 752 can include a listing or table of each of the applications stored or installed on the client 102. This listing can in some embodiments include a listing of only those applications that were installed using Citrix. In other embodiments, the listing can include a listing of all remotely provided or streamed applications. In still other embodiments, the listing can include all applications installed on the client 102. The ICA client 756, in one embodiment, can retrieve an enumeration of all the applications installed or stored on the client 102 and can send this enumeration to the server 106 where it can be processed by the application delivery store manager 766. In some embodiments, the application delivery store interface 754 can use an enumeration from the installed application store 752 to determine how to display to a user of the client 102 the listing of available applications. The installed application store 752 can in some embodiments also store configuration information for each of the applications listed or stored in the store 752. For example, the installed application store 752 may store an entry indicating that an instance of MICROSOFT WORD is installed on the client 102. This entry may further comprise configuration information indicating whether a user should interact remotely with the instance of MICROSOFT WORD or whether MICROSOFT WORD application files will be streamed to the client 102 when the user requests, via the client 102, to execute MICROSOFT WORD. In one embodiment, the installed application store 752 may store application stubs or skeletons associated with an application.

An application delivery store interface 754 can be included on the client 102. In one embodiment, the application delivery store interface 754 can interact with the ICA client 756 such that the application delivery store interface 754 can receive information from the ICA client 756 and can further transmit commands or information to the ICA client 756. The ICA client 756 can in some instances transmit graphical application data to the application delivery store interface 754, while in other embodiments the ICA client 756 does not interact with the application delivery store interface 754. The application delivery store interface 754, in some embodiments, can comprise a web-based interface that displays a listing of applications installed on a client 102, a listing of applications that are available to a particular user, and a listing of applications that are not installed on a client 102. A user of the client 102 can download applications onto the client 102 by selecting an application within the application delivery store interface 754 and clicking an associated button labeled "Add."

In one embodiment, the ICA client 756 can communicate with the ICA server client 764 executing on the server 106. The ICA client 756 can facilitate the transfer of application graphical data and server commands from the server 106 to the client 102, and can facilitate the transfer of commands and information from the client 102 to the server 106. In one embodiment, the ICA client 756 is a communication client, while in other embodiments the ICA client 756 is a communication module. The ICA client 756 can use the ICA protocol or any other presentation level protocol to transmit graphical application output from one computing machine to another.

The application delivery store interface 754 and the ICA client 756 can communicate with the server 106 via a network. In one embodiment, each of the interface 754 and the client 756 can communicate with an ICA server client 764 executing on the server 106. In one embodiment the ICA server client 764 is a client, module or application executing on the server 106 and facilitating the transfer of information from one computing machine to another. The ICA server client 764 can be referred to as a server-specific communication module, a communication module or client, or a server client. In some embodiments the ICA server client 764 can facilitate the transfer and receipt of application commands and graphical application output using the ICA protocol, in other embodiments the ICA server client 764 can use another presentation level protocol.

Also executing on the server 106 is an application delivery store manager 766 that can manage the generation of the application delivery store interface 754 and that in some embodiments, can generate the application delivery store interface 754 and transmit the interface 754 to the client 102. The application delivery store manager 766 can communicate with the privileges database 758 and the client accounts database 760. In one embodiment, the application delivery store manager 766 can query the privileges database 758 with respect to a particular user and request from the privileges database 758 a listing of the application, configuration and access privileges for a particular user. The application delivery store manager 766 can use this information to determine which applications should be listed within the application delivery store interface 754. In some embodiments, the application delivery store manager 766 may place restrictions on the applications listed in the application delivery store interface 754 based on the privileges received from the privileges database 758 for a particular user. For example, user 1 may have full access to all MICROSOFT OFFICE applications but has limited access to MATLAB applications. The privileges database 758 could, in this example, include an entry for user 1 indicating that the user may download and configure all MICROSOFT OFFICE applications at-will, but that there are certain restrictions on the user's access to MATLAB applications. In one embodiment, the entry in the privileges database 758 may indicate that the user must fill out a workflow request and request access to MATLAB applications before the user is able to receive the MATLAB application. In another embodiment, the privileges database 758 may indicate that a MATLAB application would cost the user a certain amount of money, points or employee credits (i.e. MATLAB would cost the user $300 or 500 employee credits.) In still another embodiment, the privileges database 758 may indicate that the user may only download a pared down version of MATLAB.

In some embodiments, the application delivery store manager 766 may communication with a clients accounts database 760 that stores information about the users of a system. In one embodiment, the client accounts database 760 can include information about the amount of money, employee credits or points available to a particular user. This information can be used by the application delivery store manager 766 to make access control decisions. For example, in the above example the application delivery store manager 766 could receive information from the privileges database 758, indicating that a user may purchase MATLAB for $300 U.S. dollars. In response, the application delivery store manager 766 may query the client accounts database 760 to obtain a listing of the amount of money that particular user has available to purchase MATLAB and may either incorporate this determination into the application delivery store interface 754 or may use the information to determine whether the user can download MATLAB.

Executing within the application delivery store manager 766 can be an application generator 768 that can create application stubs when the application delivery store manager 766 receives a request to download to a client 102 a particular application. In one embodiment, the application delivery store manager 766 receives a request to download to the client 102 a first application and passes that request to the application generator 768. In response the application generator 768 queries the applications database 762 for application-specific information and generates an application stub using information received from the applications database 762. The application-specific information can include any of the following information: an icon or graphical image associated with the requested application; a path indicating where the application is located on a remote computing machine or application server; a path indicating a streaming application able to stream to the client 102 the application files associated with the requested application; configuration information regarding whether the application should be streamed or interacted with remotely; configuration information regarding how the application should be displayed within the client's 102 desktop; configuration information regarding what should be installed in the client's 102 registry or file directory; or any other information pertinent to the installation of the application on the client 102. Generating the stub application can in some embodiments comprise the method described in FIG. 9.

In some embodiments the application generator 768 can execute on a client computing machine. In these embodiments, the application generator 768 can generate application stubs on the client rather than on a remote server. In other embodiments, the application generator 768 can execute partially on the client and partially on the server. In still other embodiments, the application generator 768 can execute on a computing machine remote from both the client and the server. The client 102 can talk to multiple servers, therefore one or more application generators 768 can execute on any of the servers and provide applications or application stubs to the client. Similarly, a user can access one or more application stores. A user's application delivery store account can include one or more additional application delivery store accounts. Therefore if a user has access to a first application delivery store account, a second application delivery store account and a third application delivery store account; the user's first application delivery store account can include both the second and third application delivery store account.

While the above-mentioned and below-included descriptions illustrate the application delivery store interface and application delivery store manager in terms of a virtual communication channel, in some embodiments the application delivery store interface and application delivery store manager can operate independent of a virtual communication channel such that the interface and manager communicate directly with each other over a network.

Also included on the server 106 can be a provisional user session storage 770 that can be used to store temporary user session information. For example, the provisional user session storage 770 can be used to temporarily store a listing of the applications stored locally on a client 102 and associated with a particular user. This listing can be used by the application delivery store manager 766 to determine which applications have already been installed on a particular client 102 and for a particular user. In some embodiments, the application delivery store manager 766 can use the information stored in the provisional user session storage 770 to synchronize a user's stored applications from machine to machine.

Figure 7B:
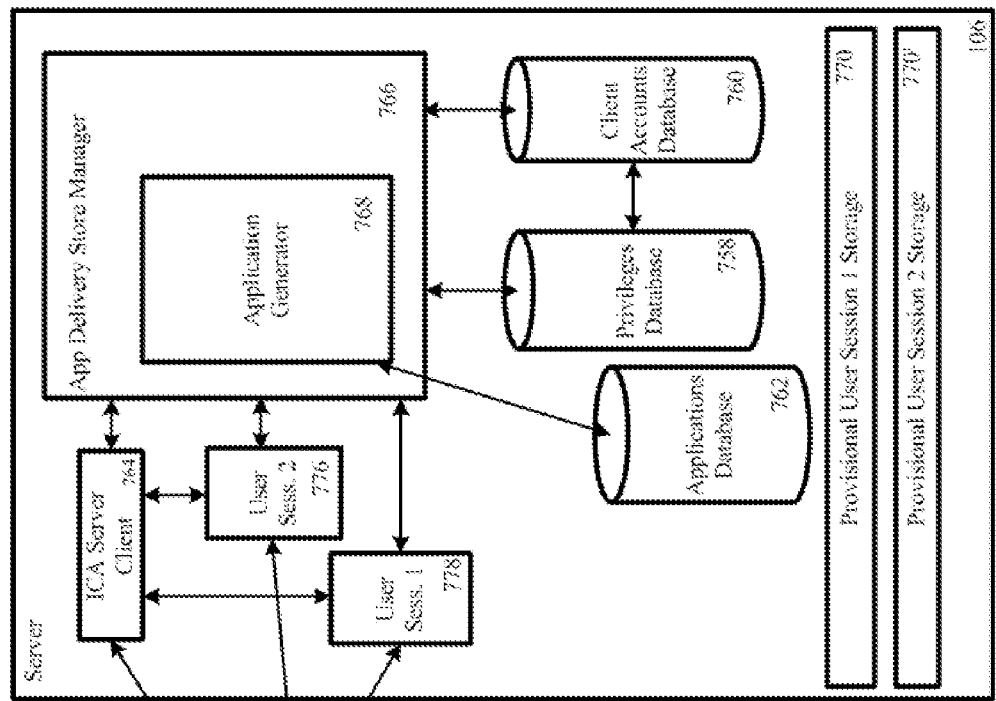
FIG. 7B is a block diagram of an embodiment of a system for delivering an interactive application store.
Figure 7B:
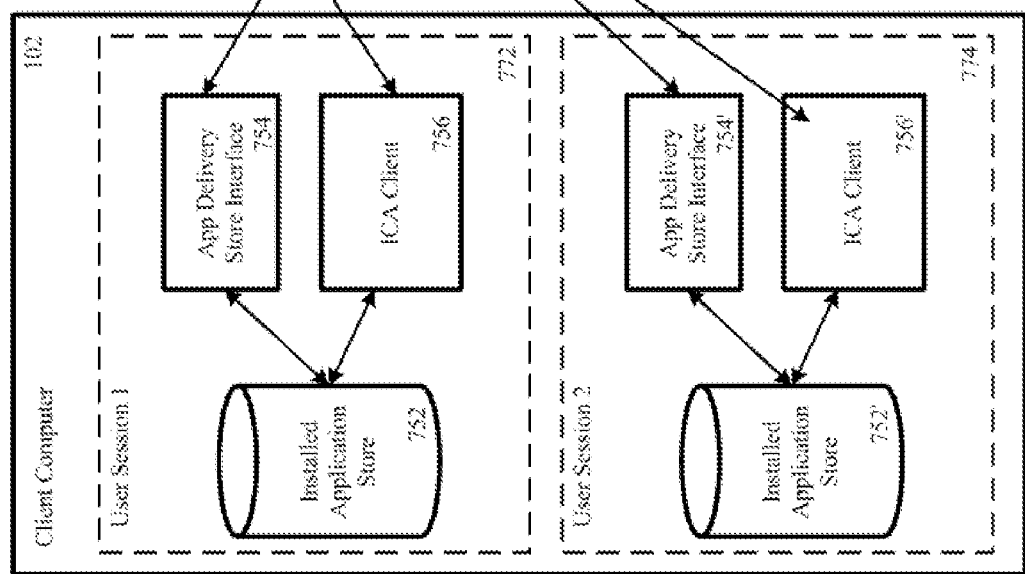

While applications can be installed through the application delivery store manager 766 and application delivery store system, in some embodiments an application can be installed by executing or otherwise launching a file attached to an email. In one embodiment, a user accesses a file attached to an email. The file is associated with a program not currently installed in the user's system. The application delivery store system (i.e. the application delivery store interface and manager), detects the un-known file-type and launches an application associated with the attached file. In one embodiment, the application is added to the user's application delivery store folder. The application can be added as a matter of course, or according to a policy system or set of user configurations. In some embodiments, a determination is first made as to whether the user may install the application, and when the user has permission to install the application. In other embodiments, the application delivery store manager may temporarily install the application in the user's application delivery store folder. Once the user finishes accessing the attached file, the application is uninstalled from the user's application delivery store folder. In still other embodiments, Illustrated in FIG. 7B is an embodiment of a system for providing users with an interactive application store. In this embodiment, two users are logged into the server 106 and therefore the application delivery store manager 766 where each user is logged onto the same client 102. In one embodiment, a first user is logged into the client 102 via a first user session 772, while a second user is logged into the client 102 via a second user session 774. The first user session 772 on the client 102 corresponds to a first user session 778 on the server 106, while the second user session 774 on the client 102 corresponds to a second user session 776 on the server 106. Each user session 772, 774, 776, 778 can communicate with the ICA server client 764, and each user session 772, 774, 776, 778 can communicate with the application delivery store manager 766. Further each user session 776, 778 on the server 106 is associated with provisional user session storage 770, 770'. Each user session on the client 102 has an instance of an installed applications store 752, 752', an application delivery store interface 754, 754' and an ICA client 756, 756'.

In one embodiment, a user of a client 102 can initiate a communication session with the server 106. This communication session can result in the creation of a user session on the client 102 and a user session on the server 106. In some embodiments, within each user session on the server 106 are applications or application instances executing on the server 106, a user profile comprised of application configuration information particular to a specific user, a file directory particular to a specific user, or other user-specific information. In one embodiment, the user-session-specific information is stored within the user session 778, 776 on a server 106, while in other embodiments the user-session-specific information is stored within provisional user session storage 770, 770'. Each user session can communicate with the application delivery store manger 766 on the server 106 and in some embodiments each user session can include an instance of the application delivery store manager. In some embodiments, the user sessions 778, 776 on the server can communicate with anyone of the applications database 762, the privileges database 758 and the client accounts database 760. In one embodiment, each user session can communicate with the client accounts database 760 such that a user, via the user session, can retrieve information about their account. For example, a use may be able to retrieve information about how much money or credit they have in their account and in some instances may be able to place more money or credit into their account.

In some embodiments, a user may be barred from downloading or otherwise installing a new application until a workflow request is granted. The user may select and application for download. This selection can cause the creation of a work order which, in some embodiments, is displayed to the user so that the user can fill in information relating to the application request. Information that can be requested from the user may include: credit card details; payment details; details regarding why the user has requested the application, i.e. details about a project or work assignment for which the application is needed; manager and group details, i.e. whether the manager has given approval, the manager's contact information, group name or department name; and any other details that may be used by an administrator to determine whether a particular user should have access to the requested application. In some embodiments, the application is not downloaded into the user's application delivery store folder until the workflow request has been approved by the appropriate person. In other embodiments, the application is provisionally downloaded into the user's application delivery store folder for a limited period of time. If the user's workflow request is approved, then the application remains in the user's application delivery store folder. If the user's workflow request is rejected, then the application is removed from the user's application delivery store folder. Determining whether to provide provisional application access can include reviewing how many times a user has requested a particular application.

Figure 8:
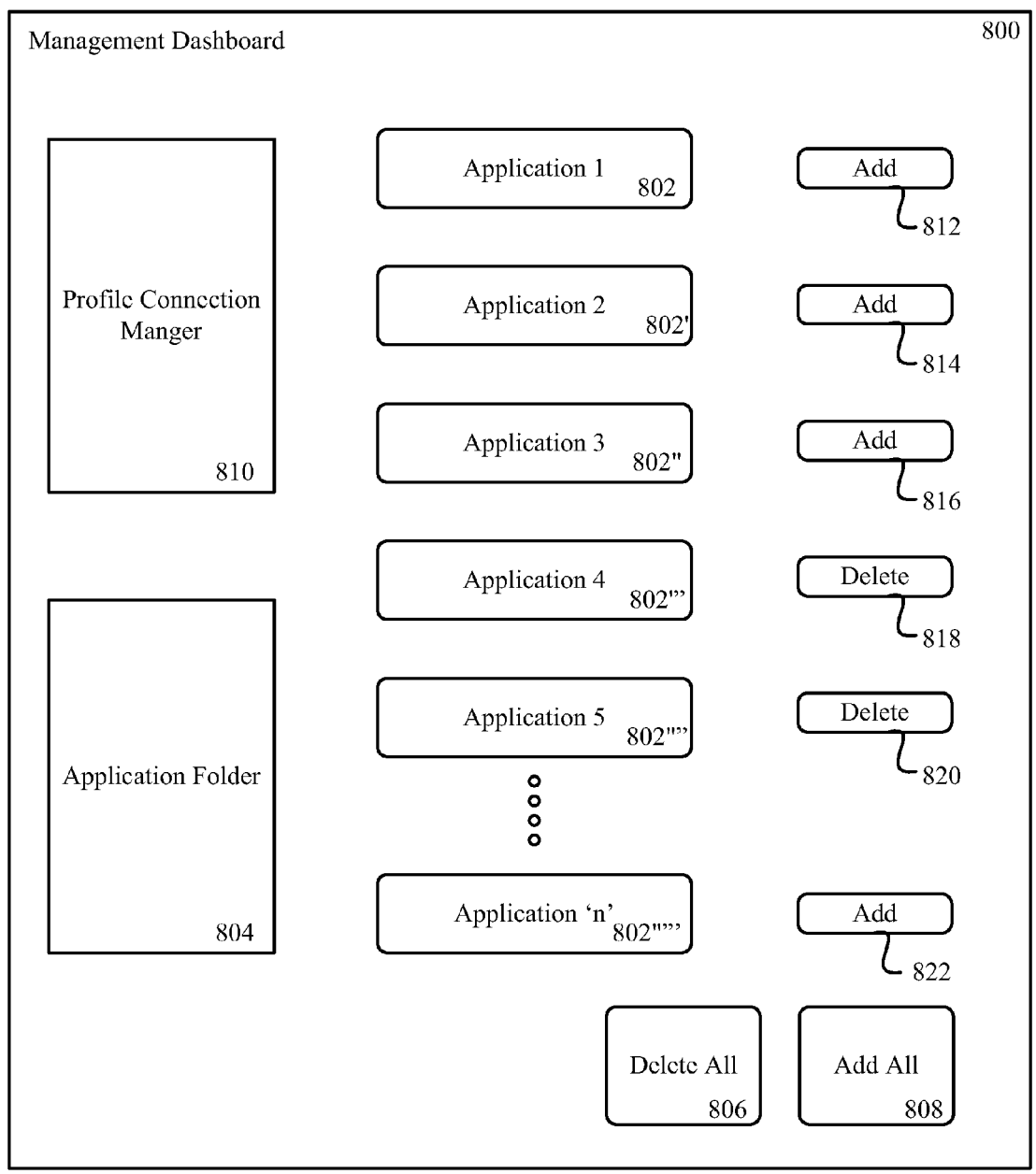
FIG. 8 is a block diagram of an embodiment of an interface for an application for delivering an interactive application store.

Illustrated in FIG. 8 is an embodiment of the application delivery store interface 754, 800. In one embodiment the application delivery store interface can include a listing of applications 802, 802', 802", 802''', 802'''', 802''''' that are either installed on the client 102, not installed on the client 102, available for download by the user or available for the user to request via a workflow. The applications 802, 802', 802", 802''', 802'''', 802''''' can be a first application, a second application, a third application, a fourth application, a fifth application and any 'n' number of applications. Collectively the applications can be referred to as applications 802. The applications 802 can be display graphically via an icon associated with the application and can be any one of: a web application such as GOOGLE DESKTOP; an executable application such as MICROSOFT WORD; an accelerator client for a LAN, WAN or any other network; a desktop such as Xen Desktop or any other desktop; a virtual machine; a cloud application such as those provided by AMAZON; a hypervisor; or any other application, virtual machine, desktop or hardware client provided as software able to be deployed via the application delivery store manager and the application delivery store interface. In some embodiments the application 802 can be streamed to the client 102, in other embodiments the application 802 can be downloaded to the client 102, while in still other embodiments the application 802 can be remotely provided to the client via a communication channel over which graphical application output can be transmitted from the server 106 to the client 102.

In some embodiments, the applications 802 listed within the application delivery store interface 800 can include those application 802 that a user of a client 102 is authorized to download. This list can be configured by an administrator through the application delivery store manager 766 or via any other administrative module or client communicating with either the application delivery store manager 766 or the application delivery store interface 754. In one embodiment, an administrator may generate a list of recommended applications and these applications may be displayed within the application delivery store interface 800 and in some embodiments may be displayed within the application delivery store interface 800 having a notation next to them indicating that the application 802 is a recommended application.

In some embodiments, the application delivery store interface 800 can include applications available on one or more virtual machines executing on a local machine. In some embodiments, when the application delivery store interface 800 is launched, a list of applications is downloaded into a user's profile. These applications are then displayed within the application delivery store interface 800 as though they were available through the application delivery store program. These programs, in some embodiments, can include programs that are locally available on a computing machine and that are accessible via a virtual machine executing on the local computing machine.

In some embodiments, one or more virtual machines can execute on a local computing machine hosting or otherwise executing the application delivery store interface 800 and accompanying program. The virtual machines can further execute or host one or more applications available only when the virtual machine executes on the local computing machine. In one example, a user can access the application delivery store interface 800 via a first computing machine. Installed on the first computing machine can be a first virtual machine for accessing the user's local desktop, and a second virtual machine for accessing the user's work desktop. Either of these desktops can be remotely hosted, or can be locally hosted by the virtual machine. Management and selection of which virtual machine to execute can be done via a hypervisor executing on the first computing machine. Each virtual machine can comprise a unique computing environment such that the first virtual machine can execute and otherwise provide a first set of applications, while the second virtual machine can execute and otherwise provide a second set of applications. The application delivery store interface 800, when launched, lists out each of the first set of applications and the second set of applications. This information can be provided to the application delivery store interface 800 by a program executing on the first computing machine and communicating with the application delivery store manager to provide the program with information regarding computing environments on the first computing machine.

In one embodiment next to each application 802 is a button to either add or delete the application. In embodiments where a particular application is not yet installed on the client 102, an add button 812, 814, 816, 822 is displayed next to the application. In embodiments where the application is already installed on the client 102, a delete button 818, 820 is displayed next to the application. Additional buttons can include a button 806 to delete all the applications installed on the client 102, while a button 808 to add all the applications installed on the client 102 can be included within the application delivery store interface 800.

In some embodiments the application delivery store interface 800 can include a profile connection manager 810, while in other embodiments the interface 800 can include a folder of all the applications installed on the client 102 and therefore installed within a user's profile.

Figure 9:
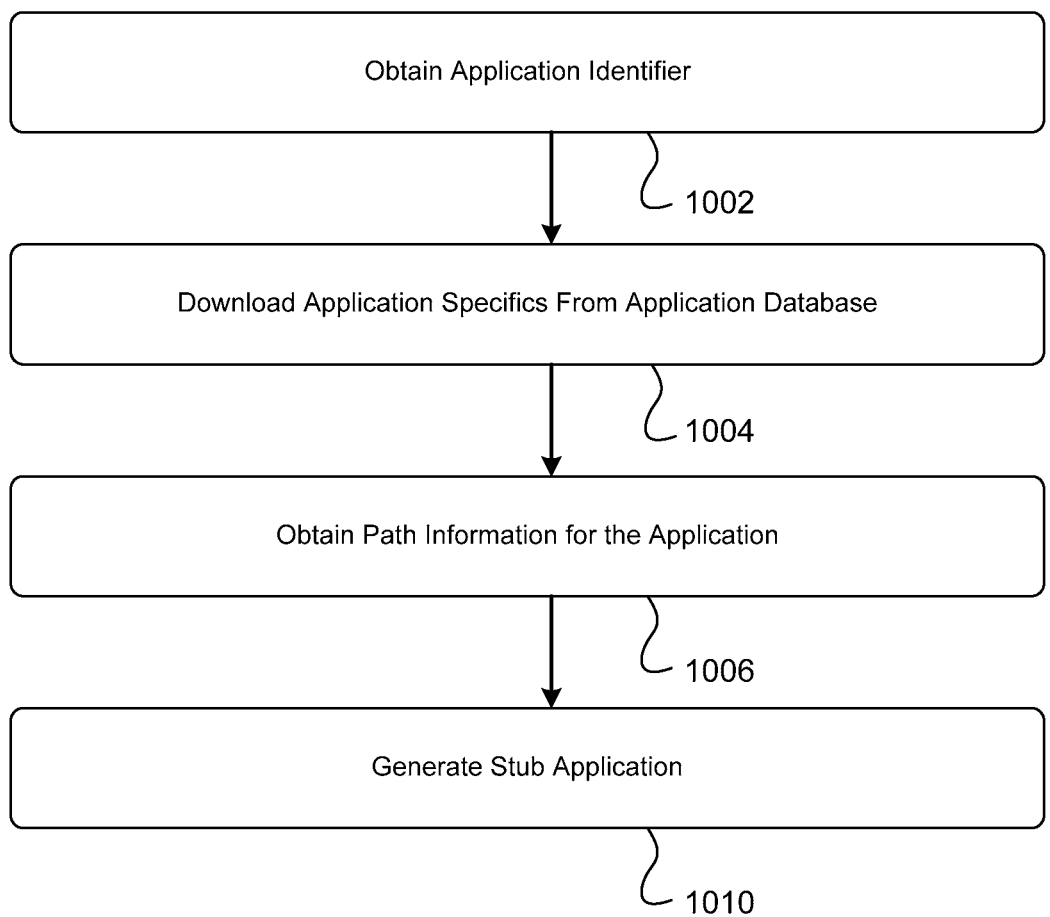
FIG. 9 is a flow diagram of an embodiment of a method for creating a stub application.

Illustrated in FIG. 9 is an embodiment of a method for generating a stub application. When a user clicks on the add button to install an application, the application generator 768 can in some embodiments, respond to this event by carrying out the steps needed to create an application skeleton or stub application associated with the selected application. In one embodiment, the application generator 768 receives the application information which can include an application identifier, an application name or any other information that can be used by the application generator 768 to identify the application (Step 1002). Once the application generator 768 receives the application identifying information, the application generator 768 can download from the applications database 762 or from any other storage repository, table or other memory location, information regard the application (Step 1004). Using the retrieved application information, the application generator 768 can then obtain path information for the application (Step 1006). Using each of the application information, the application path information and any other application or user-specific information, the application generator 768 can then generate the stub application (Step 1010).

Once the stub application is generated, the server 106 can transmit the stub application to the client 102. In some embodiments, the application delivery store interface 800 comprises a management component that retrieves the stub application and performs the steps illustrated in FIG. 10 to install the stub application onto the client 102 and into the user's profile. When the stub application is installed on the client 102, in some embodiments an entry is inserted into the installed application store 752 indicating that an application associated with the stub application was installed on the client 102 and into that user's profile. In other embodiments, the application delivery store manager 766, prior to transmitting the stub application to the client 102, installs the stub application into the user's profile which can include generating entries in any one of the provisional user session storage, the privileges database 758 and the client accounts database 760 indicating that the user profile now contains the application for which the stub application was generated.

In some embodiments, the stub application can be generated on the client 102. In these embodiments, the application delivery store can transmit to the client 102 an application identifier and any of the following additional information: a location of the application; permissions for accessing the application; application configuration information; path information for the application; an icon associated with the application; and any other information that can be used to generate a stub application on the client 102. An instance of the application generator 768 can execute on the client 102. In some embodiments, the client instance of the application generator 768 can receive the application information from the application delivery store, and can use this information to generate a stub application on the client 102. The application delivery store, in some embodiments, can transmit the application information to the client 102 in response to a user adding an application to the user's application delivery store.

Figure 10:
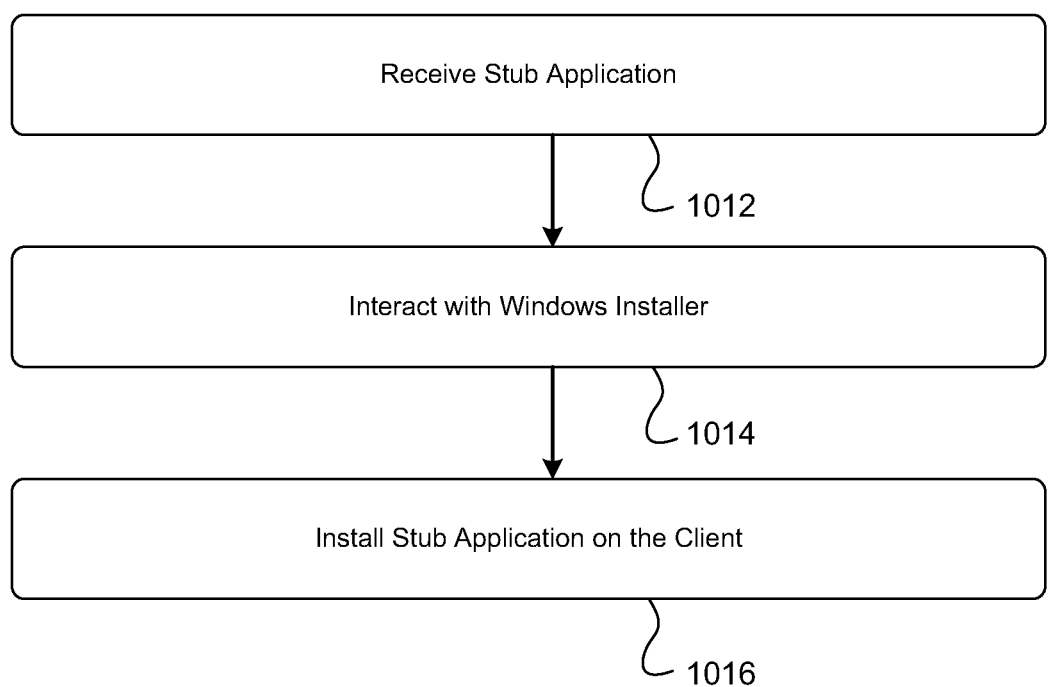
FIG. 10 is a flow diagram of an embodiment of a method for interacting with a stub application.

Illustrated in FIG. 10 is one embodiment of a process for installing the stub application on the client 102. In one embodiment a management module or client within the application delivery store interface 800 receives the stub application from the server 106 (Step 1012) and interacts with an operating system installer or other installer program to issue a command to the installer program to install the stub application (Step 1014). Subsequent to the management module's issuance of an install command, an installer program on the client 102 can install the stub application on the client 102 (Step 1016).

In some embodiments, once the stub application is installed on the client 102, the operating system and operating system components can interact with the stub application as though it were a fully installed application. For example, an icon of the stub application can be displayed in the task bar, on the desktop, in the start menu or otherwise be displayed or treated as though it were a fully installed application. When a user clicks on an icon representative of the stub application, an application window can open and a communication connection can be established between the application window a remote computing machine. In some embodiments, this communication connection can be an ICA communication channel. In other embodiments, the communication connection can be a channel over which the client 102 and server 106 can communicate via a presentation level protocol. The stub application may include an application path such that when an icon associated with the stub application is clicked or otherwise selected, a window opens up and attempts to retrieve or connect to an application or application file designated by the application path identified within the stub application.

In some embodiments, multiple icons can exist on a client 102 for a particular application. For example, the client 102 may have a full version of MICROSOFT WORD installed locally on the client 102 and an icon may be displayed on the client 102 that is associated with this version of MICROSOFT WORD. However, another icon may be displayed on the client 102 that is associated with a version of MICROSOFT WORD installed by the application delivery store interface and associated with a stub application. Thus, when the stub application icon is selected, a remote application is either streamed to the client 102 or an application window is displayed on the client 102 and within the window graphical application output from a remotely located application executing on a remote computing machine is displayed. Thus, in this type of embodiment, two MICROSOFT WORD icons may be displayed on the client 102.

In one embodiment, a user may use the application delivery store interface 800 to design a virtual machine and issue a workflow request for the virtual machine. Once this workflow request is satisfied, the user may be able to access their virtual machine (i.e. the virtual machine they designed using the application delivery store interface 800) via the application delivery store interface 800. Similarly, a user may be able to use the application delivery store interface 800 to design desktops and retrieve a uniquely designed desktop.

Allowing a user to install applications via the application delivery store interface 800 can be referred to as self-subscription in that a user is able to self-subscribe to applications that are available to them. Thus, users may construct a profile of applications that are designed to fit the user's particular needs. Accordingly, the user may choose not to include certain applications within the profile. When a user wishes to install into their profile an application not available to them through the application delivery store interface, the user may submit a workflow request for that application. Responsive to this request, an administrator may alter the user's privileges within the privileges database 758 such that the next time the user logs into the application delivery store interface 800, the application they requested is available for download.

Another aspect of the application delivery store interface 800 can be a synchronization module which can be used to synchronize the applications downloaded onto one or more machines. For example if a user logs into to a first computing machine and downloads Applications 1 and 2, but then logs into a second computing machine for the first time; it is likely that the second computing machine will not include the Application 1 and Application 2 stub applications. A synchronization mechanism or module within the application delivery store interface 800 or within the application delivery store manager 766 can be configured to automatically download stub applications for Application 1 and 2 each time a user logs into a new machine. Thus, when the user logs onto the second computing machine, either the application delivery store interface 800 or the application delivery store manager 766 can immediately construct stub applications corresponding to Applications 1 and 2, download the stub applications on the second computing machine and install the stub applications on the second computing machine.

Figure 11:
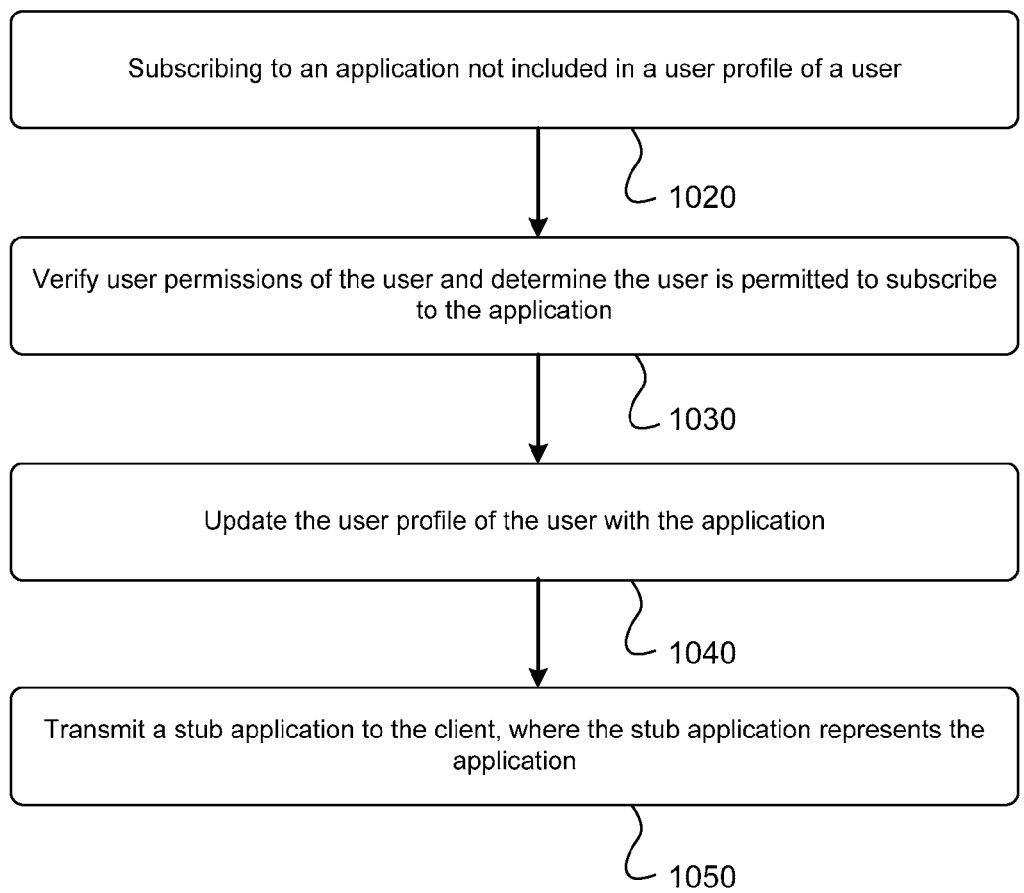
FIG. 11 is a flow diagram of an embodiment of a method for self-enrolling in an application.

Illustrated in FIG. 11 is one embodiment of a method for updating an delivering an interactive application delivery store. In one instance, a user subscribes to an application that is not included in the user's profile (Step 1020). An application delivery store, or the application delivery store manager 766, executes on a server 106 or other computer to verify user permissions of the user (Step 1030). Upon verifying that the user can subscribe to the application, the application delivery store can update the user profile with the application (Step 1040) and transmit a stub application to the client computer, where the stub application represents the application (Step 1050).

Further referring to FIG. 11, and in more detail, in some embodiments a user subscribes to an application not included in a user profile of the user via the application delivery store (Step 1020). In one embodiment, the user accesses the application delivery store or an interface of the application delivery store using a client computer 102. The client computer 102, in some embodiments, communicates with a server 106 executing the application delivery store. The client 102 can communicate with the server 106 over a virtual channel, a communicative connection, a HTTP request over a TCP channel, or using other web services. In some instances, the user can issue the request to subscribe to the application using an application delivery store interface executing on the client 102.

In some embodiments, the user subscribes to an application not included in the user's profile. A user profile can be a collection of applications, virtual machines, desktops, services and other resources available to a user through an application delivery store. Thus, the application delivery store can display all resources associated with a user, this association can be characterized as the user's profile. When a user subscribes to an application that is not included in the user's profile, in some embodiments the user is subscribing to an application that is not already included in the user's application delivery store, or an application that the user previously did not have access to.

In response to subscribing to an application, the application delivery store manager or application delivery store can verify the user permissions of the user (Step 1030). Verifying user permissions can, in some embodiments, include determining whether the user has permission to subscribe to the application. Permission to access or subscribe to an application can be based on: a security level of the user; a security level of the application; whether the user belongs to a group permitted to access the application; whether the user has enough funds to purchase the application; whether a workflow requesting access to the application has been approved; and other similar permissions. In some embodiments, a policy engine executing on the server 106 works in conjunction with the application delivery store to determine whether the user has permission to subscribe to the application. In still other embodiments, no user permissions are verified and the user is simply allowed to subscribe to any application the user wishes to subscribe to. The determination of whether the user can subscribe to the application can be done in response to verifying the user permissions.

In some embodiments, verifying the user permissions of the user can include obtaining user credentials of the user, and evaluating the user credentials to determine applications the user is permitted to access. In these embodiments, the user credentials can be obtained by the user when the user logs onto the server 106. In other embodiments, the user credentials can be obtained when the user logs into the application delivery store.

Upon verifying the user permissions the application delivery store can update the user profile of the user with the application (Step 1040). Updating the user profile of the user can include adding the subscribed-to application to the list of applications available to the user. In some cases, this can include adding the application to the list of applications available to the user through the user's application delivery store. The application delivery store, in some embodiments, can update the user's profile or list of available applications or resources in response to determining that the user has permission to subscribe to the application.

Upon updating the user profile, the application delivery store can then transmit a stub application to the client computer 102, where the stub application represents the application (Step 1050). The stub application, in some embodiments, can include a portion of the application subscribed to by the user, e.g. an application title, path or other identifying information. The identifying information is used to locate the application executing on the server 106 when the stub application is executed. In some embodiments, the stub application is transmitted to an application delivery store interface executing on the client computer 102. In other embodiments, the stub application is transmitted to the client 102 and store in an installed application store 752 on the client 102. While in one embodiment the stub application is transmitted to the client 102, in other embodiments a stub application and the entire application is transmitted to the client 102. A user can use the full application when the server 106 is not available. In some embodiments, the application delivery store can transmit application information to the client 102 so that the client can use the received application information to generate a stub application. Thus, in those embodiments, the stub application is generated on the client 102.

In one embodiment, the client 102 can receive the stub application from the server 106 and can install the stub application into a client application delivery store storage repository such as the installed application store 752 on the client 102. When a user executes the stub application, a client application delivery store interface 754 can responsively establish a connection with the server 106. Upon establishing the connection, the client application delivery store interface can transmit a request for access to the application that corresponds to the executed stub application. When the server 106 receives the request for access to the application, the server 106 can responsively execute the application that corresponds to the sub application and transmit the application output generated by the application to the client 102. In other embodiments, when the client 102 cannot access the server 106, executing the stub application can cause an instance of the application stored on the client 102 to execute.

The methods and systems described herein may be provided as one or more computer-readable programs embodied on or in one or more articles of manufacture. The article of manufacture may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include C, C++, C#, or JAVA. The software programs may be stored on or in one or more articles of manufacture as object code.

While these methods and systems have been shown and described with reference to specific preferred embodiments, it should be understood by those skilled in the art that various changes in form and detail may be made therein.

What is claimed is:

1. A method for updating and delivering an interactive application delivery store, the method comprising:
   determining, by an enrollment administration system, an identification of a user and an identification of a first client computing device;
   classifying the user into a user group based on the identification of the user;

classifying the first client computing device into a resource group based on the identification of the first client computing device;

verifying, by the enrollment administration system, user permissions of the user based at least in part on the user group and the resource group;

receiving, by an application delivery store executing on a server, a request for the user to subscribe to an application not included in a user profile of the user, the application delivery store accessible by the user using the first client computing device communicating with the application delivery store;

verifying, by the application delivery store responsive to subscribing to the application, user permissions of the user;

determining, by the application delivery store responsive to verifying the user permissions, the user is permitted to subscribe to the application;

updating, by the application delivery store responsive to the determination, the user profile of the user with the application;

determining, by a first application generator executing on the first client computing device, an application identifier;

downloading, by the first application generator from the server, application information, the application information including configuration information that identifies how to display the application within a desktop on the first client computing device;

obtaining, by the first application generator, an application path for the application;

generating, by the first application generator executing on the first client computing device, a first stub application based on the user group, the resource group, the application identifier, the application information, and the path information, the first stub application associated with an icon representative of the application and including the application path;

installing the first stub application on the first client computing device;

responsive to the user selecting the icon, connecting the first client computing device to the application designated by the application path included within the first stub application;

determining, by a synchronization module executing on a second client computing device, that the user has logged into the second client computing device; and responsive to a determination that the user has logged into the second client computing device:
  downloading, by a second application generator executing on the second client computing device, application information;
  obtaining, by the second application generator, an application path for the application; and
  generating, by the second application generator executing on the second client computing device, a second stub application based on the user group, the resource group, the application identifier, the application information, and the path information, the second stub application associated with an icon representative of the application and including the application path.

2. The method of claim 1, wherein verifying the user permissions further comprises:
obtaining user credentials of the user; and
evaluating the user credentials to determine applications the user is permitted to access.

3. The method of claim 1, wherein subscribing to the application further comprises subscribing to the application using an application delivery store interface of the application delivery store.

4. The method of claim 1, further comprising:
determining, by the application delivery store, a user of the first client computing device has executed the stub application;
establishing, by the application delivery store responsive to the determination, a communicative connection between the first client computing device and the server; and
transmitting, by the application delivery store over the established communicative connection, a request for access to an application corresponding to the stub application.

5. The method of claim 4, further comprising:
executing, by the server application delivery store responsive to receiving the request, the application corresponding to the stub application; and
transmitting application output generated by the application, to the first client computing device.

6. The method of claim 1, wherein installing the stub application further comprises installing the stub application into a client application delivery store storage repository.

7. The method of claim 1, wherein generating the stub application further comprises generating a stub application comprising a portion of the application subscribed to by the user.

8. The method of claim 1, wherein updating the user profile further comprises updating an instance of the application delivery store associated with the user.

9. The method of claim 1, wherein the server communicates with the first client computing device using web services.

10. The method of claim 1, wherein the application is located on the first client computing device.

11. The method of claim 1, wherein the application is located on a computing device remote from the first client computing device.

12. A system for updating and delivering an interactive application delivery store, the system comprising:
a first client computing device accessed by a user;
an enrollment administration system configured to:
  determine an identification of a user and an identification of the first client computing device;
  classify the user into a user group based on the identification of the user;
  classify the first client computing device into a resource group based on the identification of the first client computing device; and
  verify user permissions of the user based at least in part on the user group and the resource group;
a server communicating with the first client computing device;
wherein the user uses an application delivery store to subscribe to an application not included in a user profile of the user and the application delivery store executes on the server to:
  verify, responsive to subscribing to the application, user permissions of the user,
  determine, responsive to verifying the user permissions, the user is permitted to subscribe to the application, and
  update, responsive to the determination, the user profile of the user with the application, and wherein a first application generator executes on the first client computing device to:
- determine an application identifier;
- download application information from the server, the application information including configuration information that identifies how to display the application within a desktop on the first client computing device;
- obtain an application path for the application;
- generate a first stub application based on the user group, the resource group, the application identifier, the application information, and the path information, the first stub application associated with an icon representative of the application and including the application path; and
- install the first stub application on the first client computing device;

wherein responsive to the user selecting the icon, the first client computing device connects to the application designated by the application path included within the first stub application; and a second client computing device accessed by the user, wherein:
- a synchronization module executes on the second client computing device to determine that the user has logged into the second client computing device; and
responsive to a determination that the user has logged into the second client computing device a second application generator executes on the second client computing device to:
- download application information;
- obtain an application path for the application; and
- generate a second stub application based on the user group, the resource group, the application identifier, the application information, and the path information, the second stub application associated with an icon representative of the application and including the application path.

13. The system of claim 12, wherein the application delivery store verifies the user permissions by obtaining user credentials of the user, and evaluating the user credentials to determine applications the user is permitted to access.

14. The system of claim 12, wherein subscribing to the application further comprises subscribing to the application using an application delivery store interface of the application delivery store.

15. The system of claim 12, where the application delivery store:
- determines a user of the first client computing device executed the stub application;
- establishes, responsive to the determination, a communicative connection between the first client computing device and the server; and
- transmits, over the established communicative connection, a request for access to an application corresponding to the stub application.

16. The system of claim 15, wherein the application delivery store:
- executes, responsive to receiving the request, the application corresponding to the stub application, and transmits application output generated by the application, to the first client computing device.

17. The system of claim 12, wherein the first client computing device installs the stub application into a client application delivery store storage repository.

18. The system of claim 12, wherein the stub application comprises a portion of the application subscribed to by the user.

19. The system of claim 12, wherein updating the user profile further comprises updating an instance of the application delivery store associated with the user.

20. The system of claim 12, wherein the server communicates with the first client computing device using web services.

21. The system of claim 12, wherein the application delivery store transmits application information.

22. The system of claim 12, wherein the application is located on the first client computing device.

23. The system of claim 12, wherein the application is located on a computing device remote from the first client computing device.

24. The method of claim 12, wherein the first client computing device is a networked resource.

25. The system of claim 12, wherein the resource group of the first client computing device includes one of Workstations, CAD Terminals, and Administrative Assistant Terminals.

* * * * *